US007311512B2

(12) United States Patent
Yanagisawa et al.

(10) Patent No.: US 7,311,512 B2
(45) Date of Patent: Dec. 25, 2007

(54) THREE-DIMENSIONAL HARD COPY APPARATUS

(75) Inventors: Shigekazu Yanagisawa, Ueda (JP); Yoshimichi Yonezawa, Chikuma (JP)

(73) Assignee: Seiko Epson Corporation (JP)

( * ) Notice: Subject to any disclaimer, the term of this patent is extended or adjusted under 35 U.S.C. 154(b) by 319 days.

(21) Appl. No.: 11/085,592

(22) Filed: Mar. 21, 2005

(65) Prior Publication Data

US 2005/0220923 A1 Oct. 6, 2005

(30) Foreign Application Priority Data

Mar. 22, 2004 (JP) ............................ 2004-083698

(51) Int. Cl.
*B29C 59/02* (2006.01)

(52) U.S. Cl. .................... 425/385; 425/398; 425/403.1

(58) Field of Classification Search ............. 425/403.1, 425/397, 398, 385; 434/114
See application file for complete search history.

(56) References Cited

U.S. PATENT DOCUMENTS

| | | | | |
|---|---|---|---|---|
| 4,191,945 | A * | 3/1980 | Hannen et al. | 340/407.1 |
| 4,586,904 | A | 5/1986 | Chlumsky | 439/114 |
| 5,192,560 | A * | 3/1993 | Umetsu et al. | 425/175 |
| 5,717,423 | A * | 2/1998 | Parker | 345/108 |
| 5,720,907 | A * | 2/1998 | Anderson et al. | 264/1.25 |

FOREIGN PATENT DOCUMENTS

| | | |
|---|---|---|
| DE | 3428065 | 2/1985 |
| DE | 19547942 | 3/1997 |
| JP | 60-046213 | 3/1985 |
| JP | 60-206608 | 10/1985 |
| JP | 61-233509 | 10/1986 |
| JP | 61-233510 | 10/1986 |
| JP | 08-036679 | 2/1996 |
| JP | 08-244285 | 9/1996 |
| JP | 11-157201 | 6/1999 |
| JP | 2003-323110 | 11/2003 |
| WO | 95/34429 | 12/1995 |

OTHER PUBLICATIONS

Communication from European Patent Office regarding corresponding application.

* cited by examiner

*Primary Examiner*—Yogendra N. Gupta
*Assistant Examiner*—Emmanuel S Luk
(74) *Attorney, Agent, or Firm*—Harness, Dickey & Pierce, P.L.C.

(57) ABSTRACT

A three-dimensional hard copy apparatus including: a shape forming unit including plural display pins having a contact unit, which selectively contacts a thermoplastic sheet, and moves relative to a display surface and is capable of forming a predetermined pattern; a drive unit that selectively drives the plural display pins; a lock sheet that holds the positions of the plural display pins; and a fan that moves the thermoplastic sheet in a direction of the shape forming unit and brings the thermoplastic sheet into press contact with the shape forming unit, wherein the apparatus forms the predetermined pattern with the shape forming unit, holds the plural display pins with the lock sheet, and brings the thermoplastic sheet and the shape forming unit with the fan to mold a pattern of a shape matching the predetermined pattern, which is formed by the shape forming unit, on the thermoplastic sheet.

16 Claims, 21 Drawing Sheets

THREE-DIMENSIONAL HARD COPY APPARATUS

RELATED APPLICATIONS

This application claims priority to Japanese Patent Application No. 2004-083698 filed Mar. 22, 2004 which is hereby expressly incorporated by reference herein in its entirety.

BACKGROUND

1. Technical Field

The present invention relates to a three-dimensional hard copy apparatus.

2. Related Art

There are known techniques for fixing a sheet-like object to be molded of thermoplastic or the like in a frame. There are also known techniques for applying heat to soften the object to be molded, applying a suction to discharge the air inside the frame via a mold obtained by hardening powder (metal powder, ceramic powder, sand, etc.), which is provided in a lower part of the frame, and applying an attractive force to mold the object to be molded according to the mold (see, for example, JP-A-60-46213 and JP-A-60-206608).

However, there is a problem in that these molds are fixed and cannot be changed easily. In addition, manufacturing the molds is large scale, consumes time and cost, and is unsuitable when a large quantity of identical type molds are not manufactured.

On the other hand, there are techniques for aggregating a large number of linear bars to form an aggregate surface and cutting and grinding the aggregate surface to process the aggregate surface into a required mold surface shape to obtain a mold (see, for example, JP-A-61-233509 and JP-A-61-233510).

However, in these molds, since machining such as cutting and grinding is performed, there are problems in that, for example, a pin cannot be re-used once the pin is used and treatment for fixing the linear bars being formed is required after being processed into the required surface shape.

It is an object of the invention to provide a three-dimensional hard copy apparatus that can mold an object freely and in a fine shape.

SUMMARY

The above and other objects are attained by the invention described below.

The three-dimensional hard copy apparatus of the invention includes: a shape forming unit that includes a display surface and plural pins which are in contact with a sheet-like object to be molded, have contact sections provided on the display surface side at tips thereof, and are provided to be movable with respect to the display surface, and is capable of forming a predetermined pattern; a drive unit that drives the plural pins selectively; a holding unit that holds positions of the plural pins, respectively; and a press-contact unit that moves one of the object to be molded and the shape forming unit with respect to the other in a direction in which the object to be molded and the shape forming unit approach each other and brings the object to be molded and the shape forming unit into press contact with each other, wherein the three-dimensional hard copy apparatus forms the predetermined pattern with the shape forming unit, holds the plural pins with the holding unit, and brings the object to be molded and the shape forming unit into press contact with each other with the press contact unit to thereby form a pattern having a shape matching the predetermined pattern formed by the shape forming unit on the object to be molded.

Consequently, it is possible to easily obtain a three-dimensional hard copy apparatus that can mold an object to be molded in a fine shape by changing a shape of the shape forming unit freely and finely, keeping the shape, and bringing the shape forming unit and the object to be molded into press contact with each other.

In the three-dimensional hard copy apparatus of the invention, it is preferable that the object to be molded has thermoplasticity, and the three-dimensional hard copy apparatus includes a heating unit that heats the object to be molded.

By using a thermoplastic sheet as the object to be molded and heating the thermoplastic sheet, the thermoplastic sheet comes into a plastically deformable state, and it is possible to form a predetermined shape easily.

In the three-dimensional hard copy apparatus of the invention, it is preferable that the three-dimensional hard copy apparatus includes a supply and discharge unit that supplies and discharges the object to be molded to and from the shape forming unit.

Consequently, it is possible to supply the object to be molded to the shape forming unit surely and discharge a sheet from the shape forming unit surely. Thus, it is possible to improve the efficiency of the molding work.

In the three-dimensional apparatus of the invention, it is preferable that the direction in which the object to be molded and the shape forming unit approach each other and a longitudinal direction of the display pins substantially coincide with each other.

Consequently, it is possible to cause the object to be molded and the shape forming unit to approach each other and separate from each other easily.

In the three-dimensional hard copy apparatus of the invention, it is preferable that the shape forming unit has plural holes that are arranged in a matrix shape and through which the display pins are inserted and slide freely and includes a guide section that supports the pins.

Consequently, it is possible to move the plural pins smoothly, respectively. In addition, it is possible to reduce a diameter of the holes in the guide section and reduce a pitch between the adjacent holes (arrange the holes at a high density) and form a predetermined fine unevenness pattern easily.

In the three-dimensional hard copy apparatus of the invention, it is preferable that the press contact unit attracts the object to be molded in a direction in which the object to be molded approaches the shape forming unit to thereby bring the object to be molded into press contact with the shape forming unit.

Consequently, it is possible to bring the object to be molded and the shape forming unit into press contact with each other easily.

In the three-dimensional hard copy apparatus of the invention, it is preferable that the shape forming unit has plural holes that are arranged in a matrix shape and through which the display pins are inserted and slide freely and includes a guide section that supports the pins, and the press contact unit attracts the object to be molded in a direction in which the object to be molded approaches the shape forming unit from the display surface and an opposite surface side of the guide section via the holes to thereby bring the object to be molded into press contact with the shape forming unit.

Consequently, it is possible to move the plural pins smoothly, respectively. It is possible to reduce a diameter of the holes in the guide section and reduce a pitch between the adjacent holes (arrange the holes at a high density) and form a predetermined fine unevenness pattern easily. It is possible to bring the object to be molded and the shape forming unit into press contact with each other easily. In addition, it is possible to simplify a structure for the attraction by performing the attraction via the holes.

In the three-dimensional hard copy apparatus of the invention, it is preferable that the three-dimensional hard copy apparatus includes a cooling unit that cools the object to be molded.

Consequently, it is possible to form a pattern matching a predetermined pattern on the object to be molded efficiently.

In the three-dimensional hard copy apparatus of the invention, it is preferable that the cooling unit is constituted to attract the object to be molded in a direction in which the object to be molded approaches the shape forming unit to thereby lower the atmospheric pressure and cool the object to be molded.

Consequently, it is possible to constitute a mechanism for cooling the object to be molded easily. In addition, since the object to be molded, which is heated by the heating unit, can be cooled surely and quickly, it is possible to mold the object to be molded efficiently.

In the three-dimensional hard copy apparatus of the invention, it is preferable that the press contact unit also serves as the cooling unit.

Consequently, it is possible to simplify a structure of the entire apparatus.

In the three-dimensional hard copy apparatus of the invention, the holding unit holds the plural display pins selectively in a display position where the plural display pins project from the display surface and a basic position where the display pins do not project from the display surface.

Consequently, it is possible to form a predetermined unevenness pattern on the display surface easily.

In the three-dimensional hard copy apparatus of the invention, it is preferable that the display pins have first engagement sections and second engagement sections, and the holding unit includes a lock member that engages with the first engagement sections of the display pins in the display position to thereby hold the display pins so as to be unmovable in both directions of the moving direction of the display pins and release the engagement to release the holding in the display position and engages with the second engagement sections of the display pins in the basic position to thereby hold the display pins so as to be movable in the direction to the display position.

Since the respective display pins and the lock member engage with each other in the display position and the basic position, it is possible to hold the respective display pins in the display position and the basic position surely with a simple structure. In addition, it is possible to release the holding of the display pins easily by releasing the engagement of the lock member and the display pins in the display position.

In the three-dimensional hard copy apparatus of the invention, it is preferable that the lock member includes plural openings through which the plural display pins are inserted, respectively.

Consequently, it is possible to simplify a structure of the lock member.

In the three-dimensional hard copy apparatus of the invention, it is preferable that the lock member is constituted by a member having elasticity.

Consequently, the lock member can be biased surely to engage with the first engagement section in the display position.

In the three-dimensional hard copy apparatus of the invention, it is preferable that the three-dimensional hard copy apparatus includes a biasing member that biases the display pins in a direction from the display position to the basic position.

Consequently, it is possible to move the display pins from the display position to the basic position smoothly and surely.

In the three-dimensional hard copy apparatus of the invention, it is preferable that the drive unit is constituted by plural cores constituted by a magnetic substance, plural cylindrical support sections that slidably support the respective cores, and plural solenoids that are set so as to surround the respective support sections.

Consequently, it is possible to simplify a structure of the drive unit.

In the three-dimensional hard copy apparatus of the invention, it is preferable that the three-dimensional hard copy apparatus includes a moving unit that moves the drive unit relative to the shape forming unit.

The shape forming unit and the drive unit are constituted to be separated from each other and the drive unit is moved relatively to the shape forming unit, whereby it is possible to make the pin thinner and to reduce a pitch between the adjacent pins (arranged the pins at a high density). Consequently, it is possible to display a fine unevenness pattern and display tactile information accurately and surely using the three-dimensional hard copy apparatus of the invention.

DETAILED DESCRIPTION

A three-dimensional hard copy apparatus of the invention will be hereinafter explained in detail based on preferred embodiments shown in the accompanying drawings.

Figure 1:
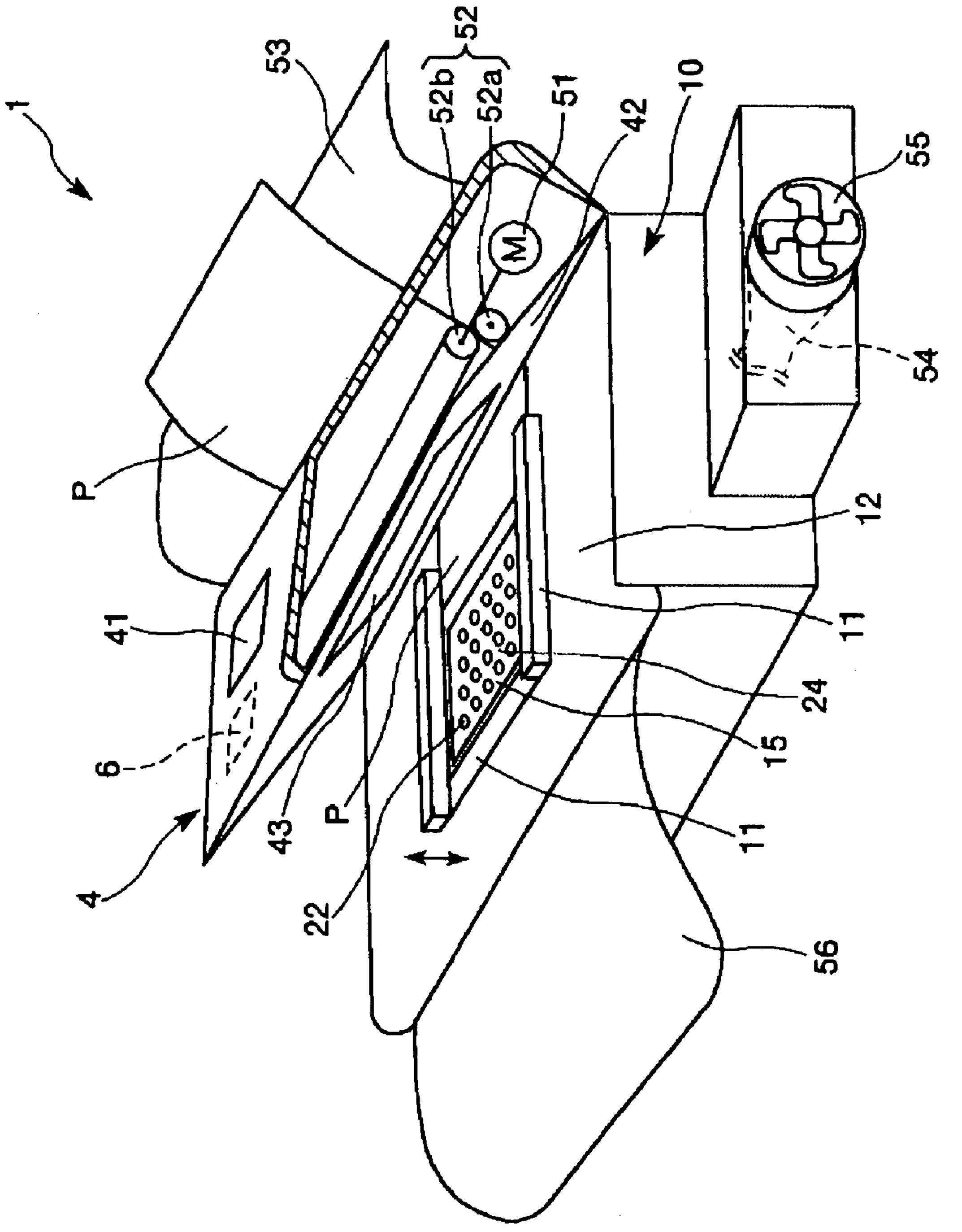
FIG. 1 is a perspective view showing an embodiment of a three-dimensional hard copy apparatus of the invention.
Figure 2:
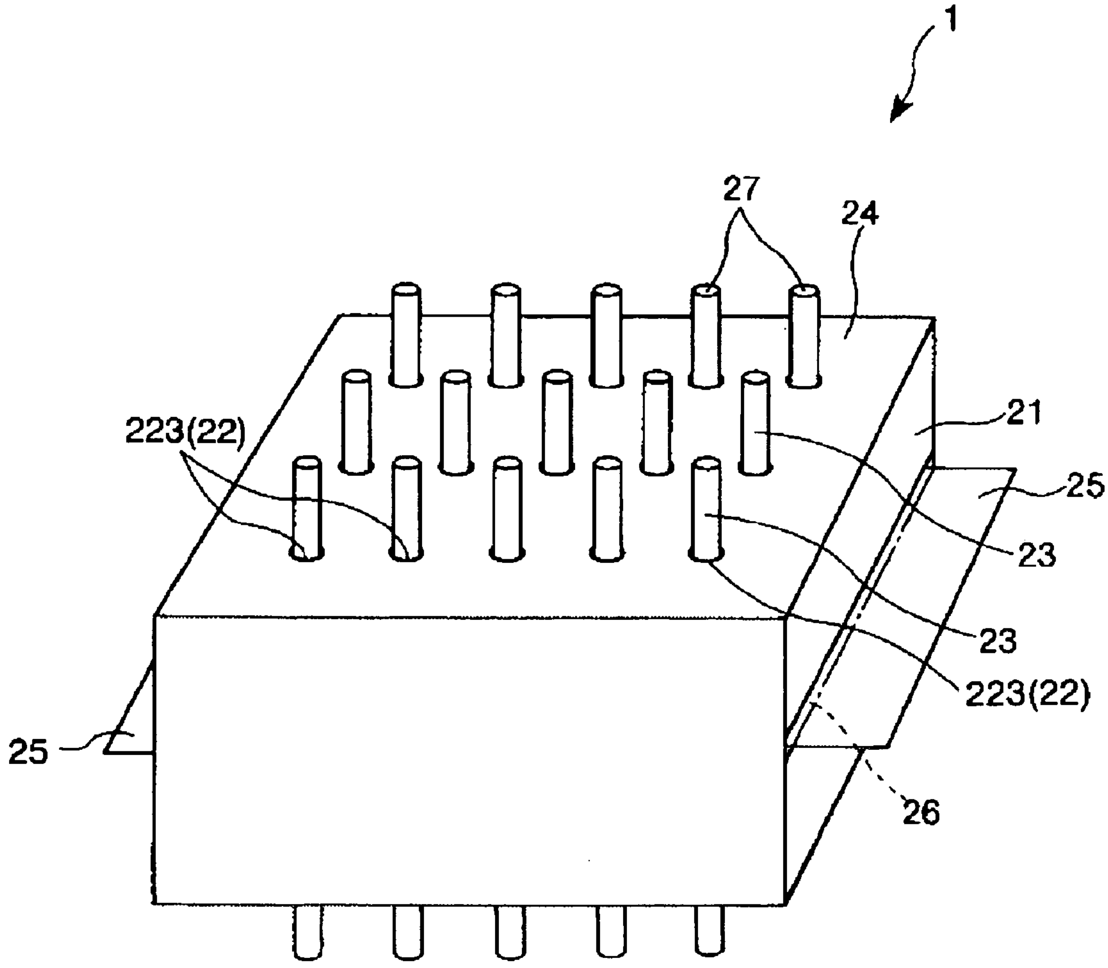
FIG. 2 is a perspective view showing a shape forming unit of the three-dimensional hard copy apparatus shown in FIG. 1.
Figure 3:
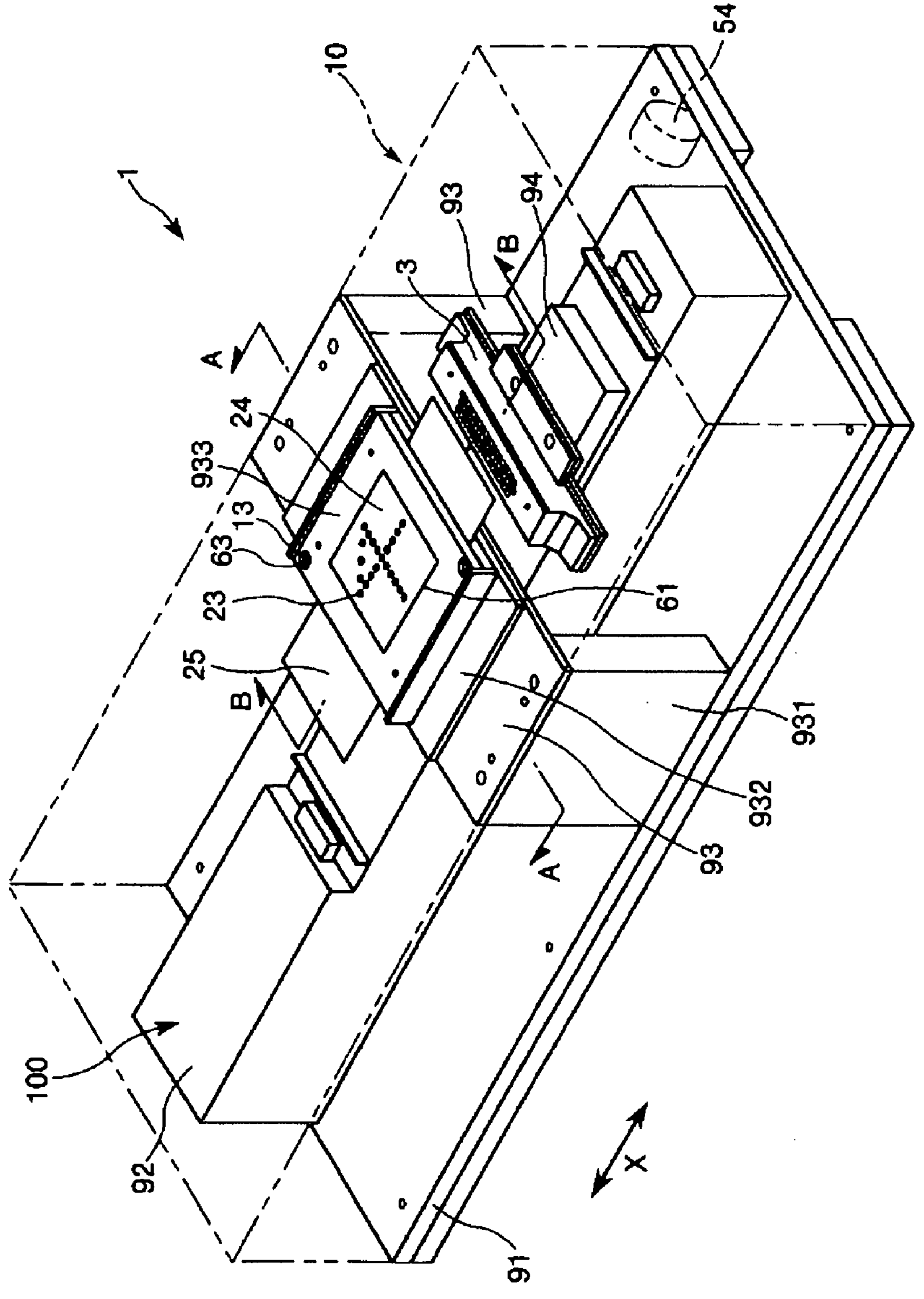
FIG. 3 is a perspective view showing a tactile display of the three-dimensional hard copy apparatus in FIG. 1.
Figure 4:
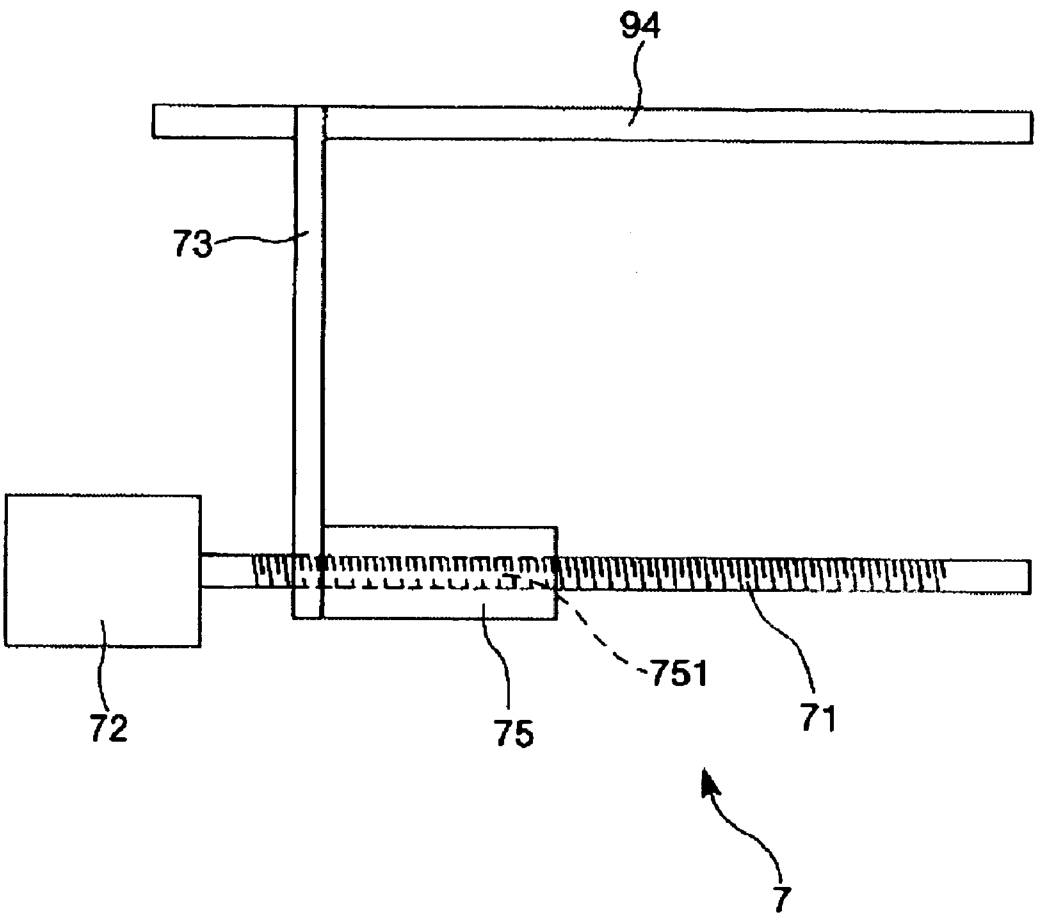
FIG. 4 is a diagram explaining a moving unit of the tactile display in FIG. 3.
Figure 5:
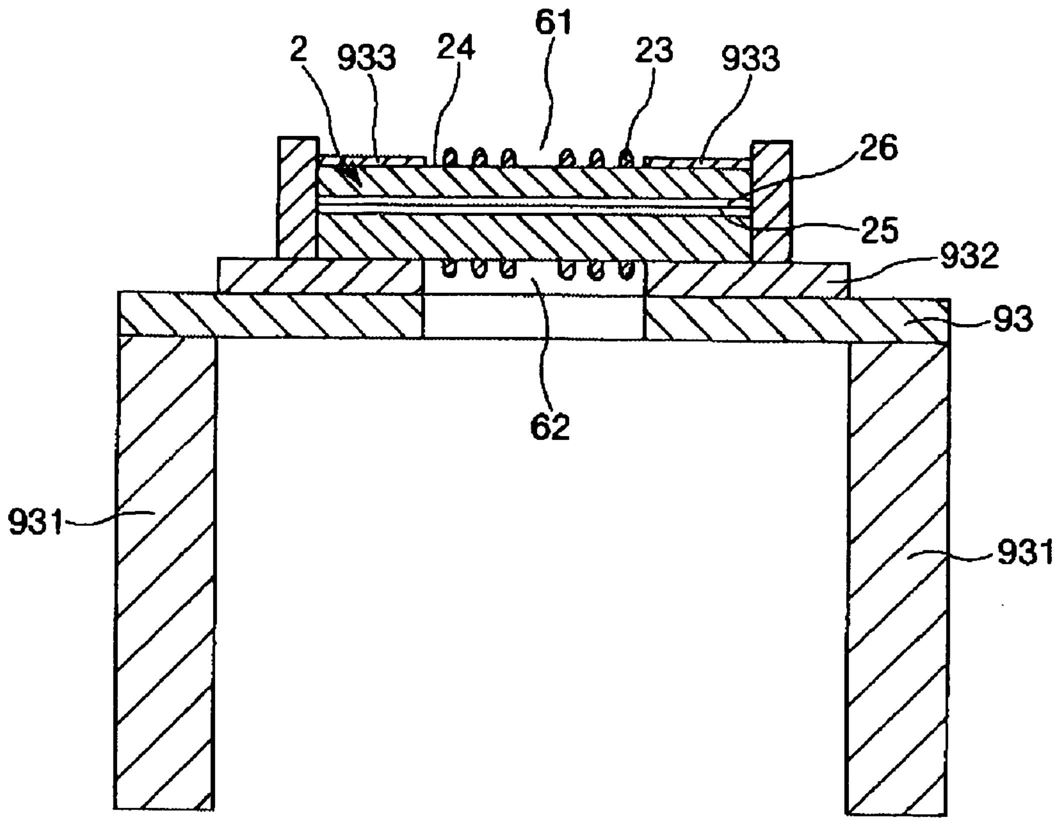
FIG. 5 is a sectional view along line A-A in FIG. 3.
Figure 6:
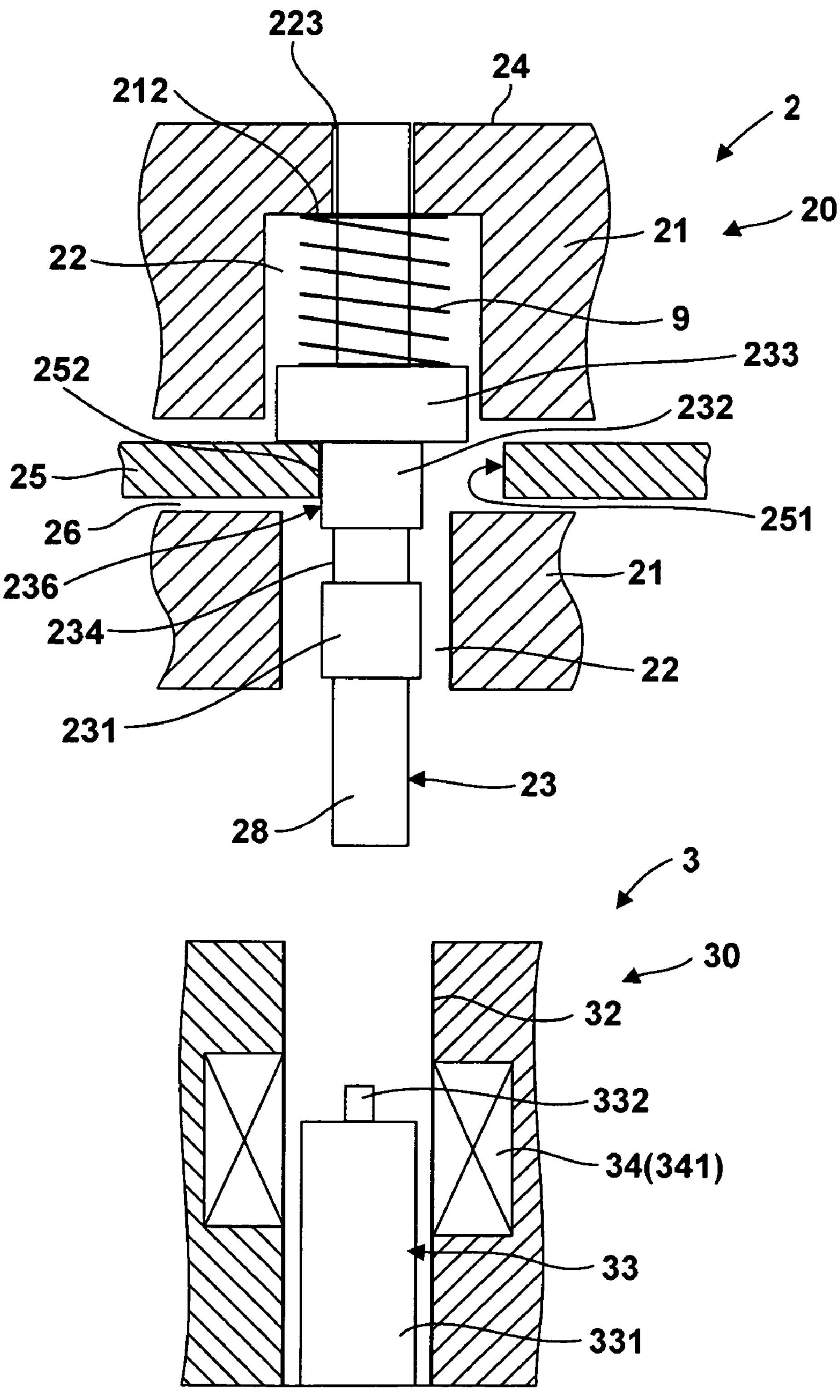
FIG. 6 is a side view showing a part of the shape forming unit and a part of a drive unit at the time when a display pin of the tactile display in FIG. 3 is in a basic position.
Figure 7:
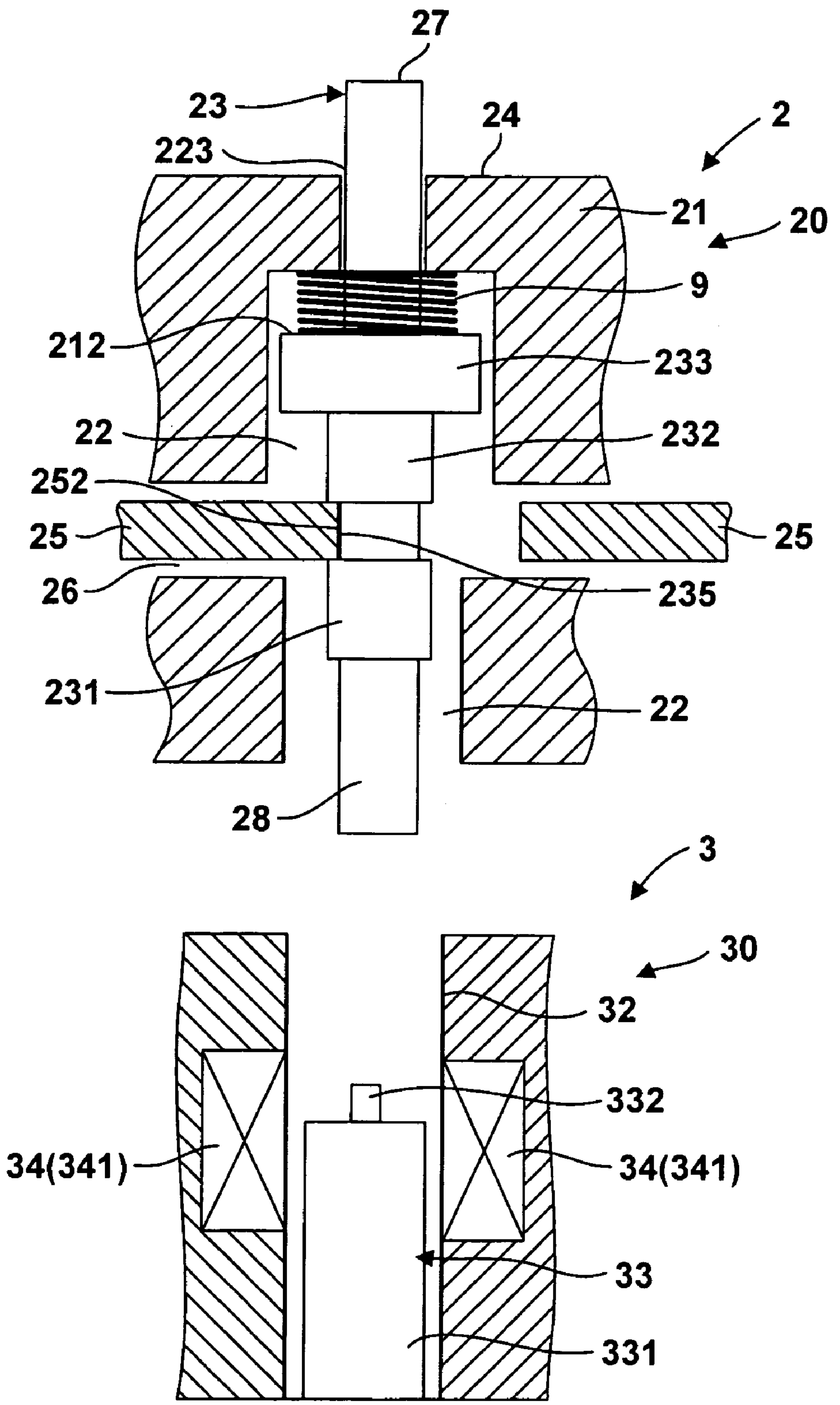
FIG. 7 is a side view showing a part of the shape forming unit and a part of the drive unit at the time when the display pin of the tactile display in FIG. 3 is in a display position.
Figure 8:
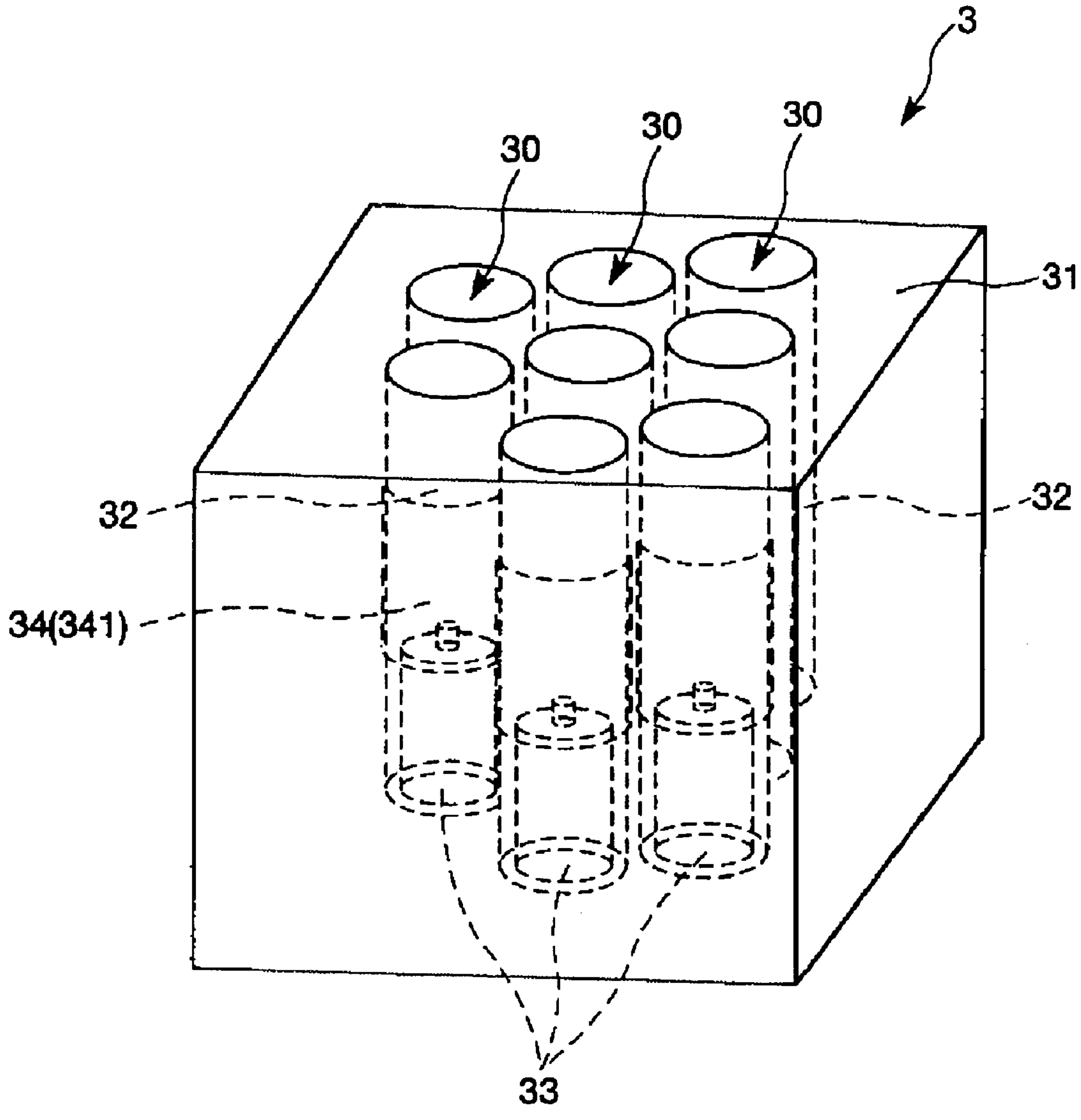
FIG. 8 is a perspective view showing the drive unit of the tactile display in FIG. 3.
Figure 11:
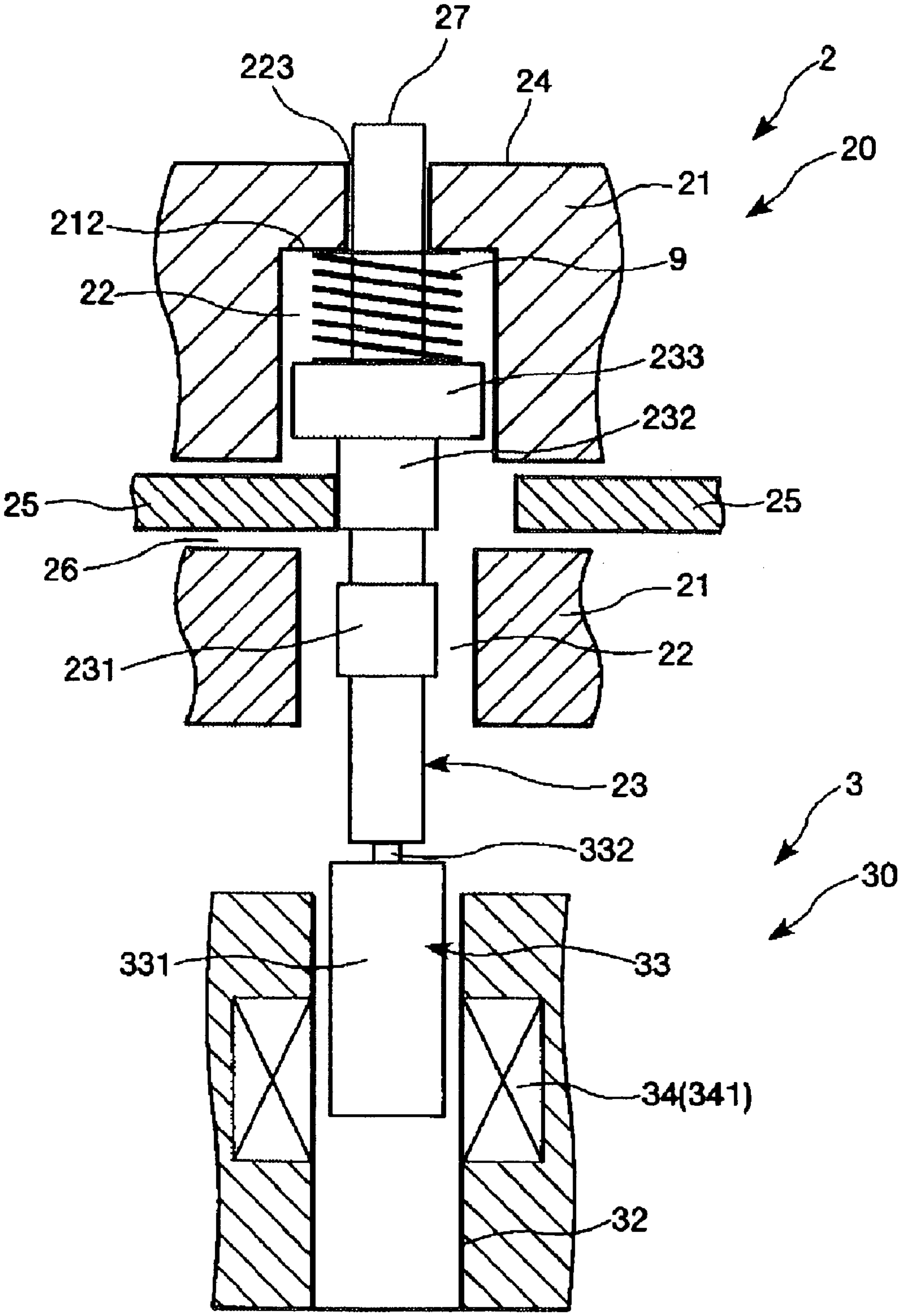
FIG. 11 is a diagram explaining an operation of the tactile display in FIG. 3.
Figure 12:
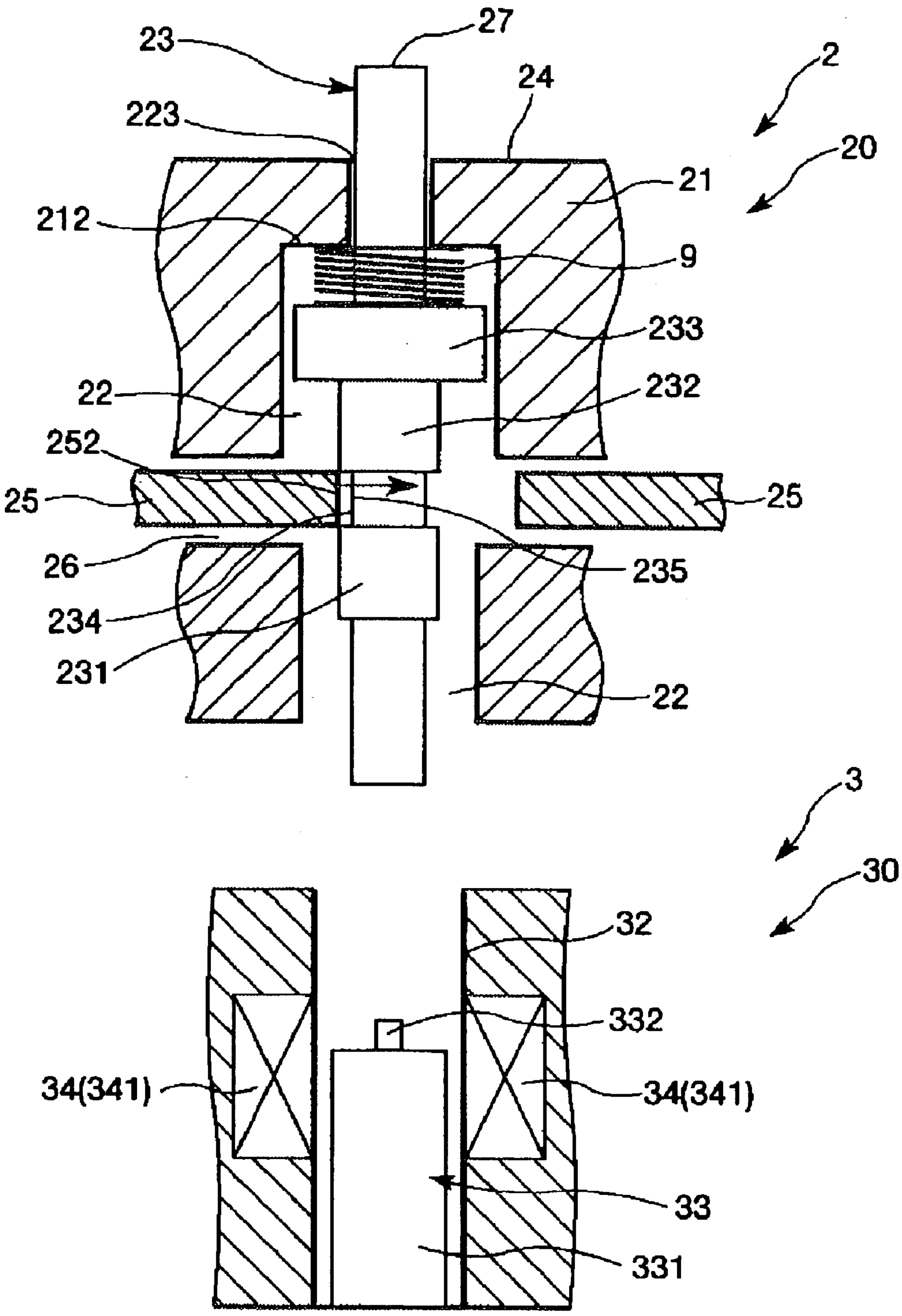
FIG. 12 is a diagram explaining an operation of the tactile display in FIG. 3.
Figure 13A:
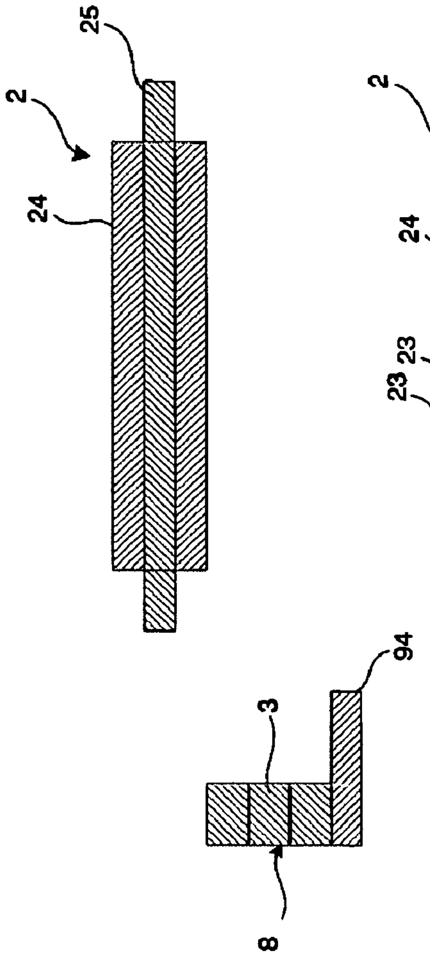
FIG. 13 is a sectional view along line B-B in FIG. 3.
Figure 13B:
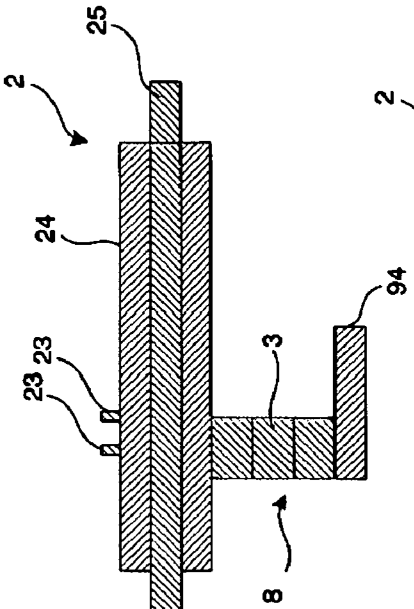
Figure 13C:
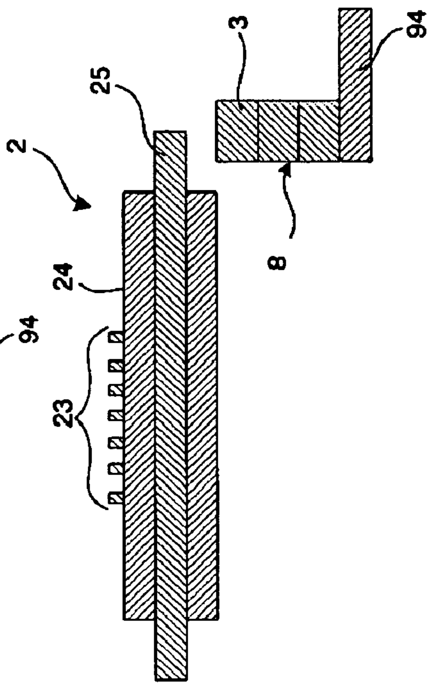
Figure 14:
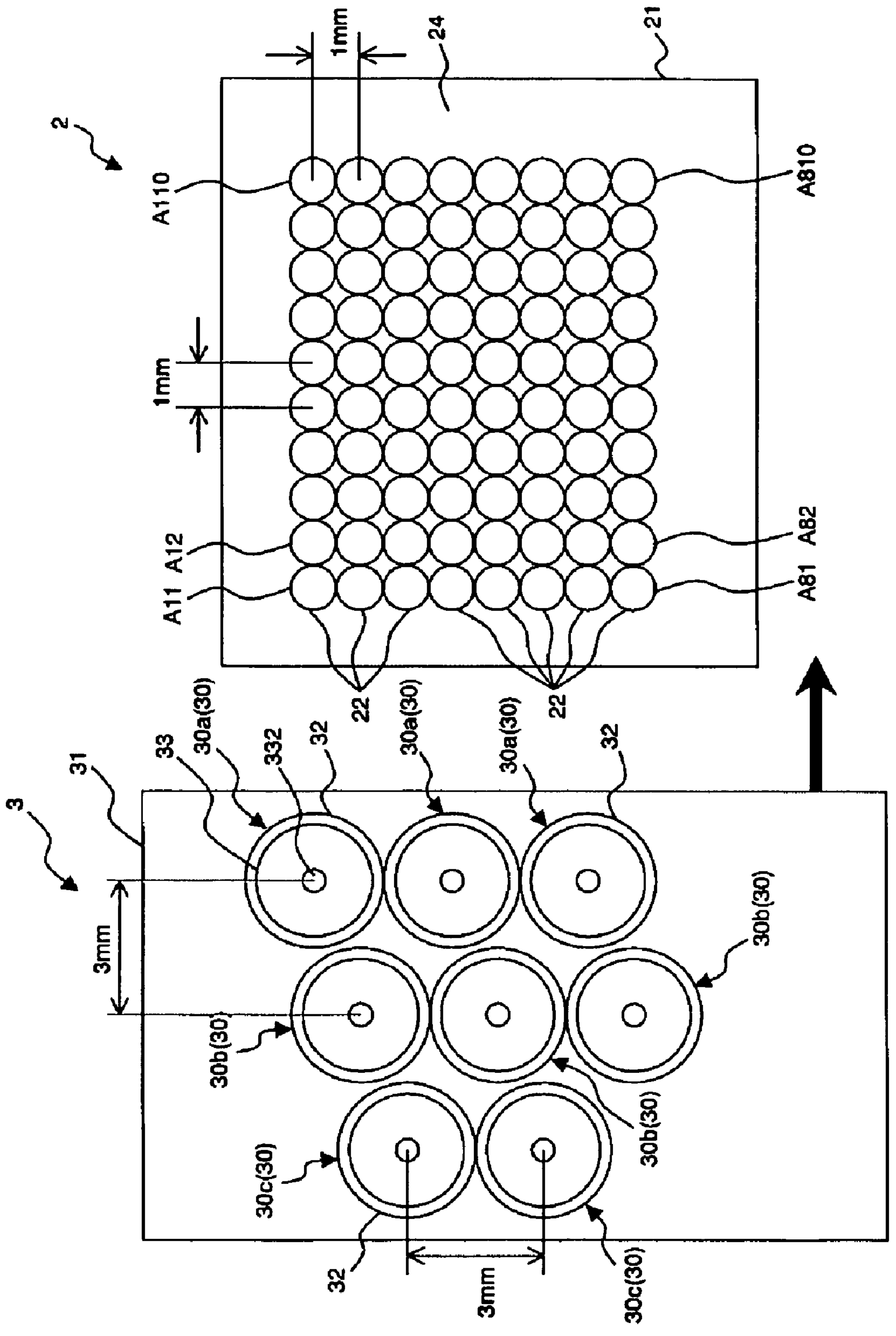
FIG. 14 is a plan view (a top view) showing a state in which driving units launch the launch cores to desired display units.

FIG. 1 is a perspective view showing an embodiment of the three-dimensional hard copy apparatus of the invention. FIG. 2 is a perspective view showing a shape forming unit of the three-dimensional hard copy apparatus shown in FIG. 1. FIG. 3 is a perspective view showing a tactile display in the three-dimensional hard copy apparatus in FIG. 1. FIG. 4 is a side view showing a moving unit for the tactile display in FIG. 3. FIG. 5 is a sectional view along line A-A of the tactile display in FIG. 3. FIG. 6 is a side view showing a part of the shape forming unit and a part of a drive unit at the time when the display pins are in a basic position. FIG. 7 is a side view showing a part of the shape forming unit at the time when the display pins are in a display position. FIG. 8 is a perspective view showing a drive unit for the tactile display in FIG. 3. FIGS. 11 and 12 are views explaining operations of the tactile displays. FIG. 13 is a sectional view along line B-B of the tactile display in FIG. 3. A part of the tactile display is not shown in FIG. 13.

Note that, in the following explanation, for convenience of explanation, a direction of arrow x in FIG. 3 and a left-to-right direction in FIG. 13 will be referred to as an “axial direction”, movement in the axial direction and in a right direction in FIG. 13 is referred to as “move forward in the axial direction”, movement in the axial direction and in a left direction in FIG. 13 is referred to as “move backward in the axial direction”, and an upper side in FIG. 6 is referred to “upper” and a lower side is referred to as “lower” or a “base end”.

A three-dimensional hard copy apparatus 1 of this embodiment is constituted to bring a heated thermoplastic sheet (object to be molded) P into abutment against a predetermined unevenness pattern representing, for example, a character, an image, or the like created by using display pins 23 of a tactile display 100 and applying pressure to the thermoplastic sheet to thereby form a pattern of a shape matching the predetermined unevenness pattern, which is formed by a shape forming unit 2, on the thermoplastic sheet P.

The predetermined unevenness pattern created by using the display pins 23 of the tactile display 100 will be hereinafter referred to as a mold pattern.

The three-dimensional hard copy apparatus 1 shown in FIG. 1 includes an apparatus body 10. A tray 53 in which the sheet-like thermoplastic sheet (object to be molded) P is provided behind in an upper part of the apparatus body 10, a discharged sheet guiding plate 56, which discharges the thermoplastic sheet P, is provided in front in a lower part of the apparatus body 10, and an upper unit 4 is provided in an upper part of the apparatus body 10. These respective components will be hereinafter explained sequentially.

The upper unit 4 includes an operation panel 41, a sheet feeding device (a supply and discharge unit) 5 that supplies and discharges the thermoplastic sheet P to and from the tactile display 100 to be described later, and a control unit 6 that controls the tactile display 100 and the sheet feeding device 5.

The upper unit 4 is fixed to an end of the apparatus body 10 such that an inner surface 42 thereof inclines at a predetermined angle with respect to an upper surface 12 of the apparatus body 10.

A halogen lamp (a heating unit) 43 is provided on the inner surface 42 of the upper unit 4. Consequently, it is possible to heat the thermoplastic sheet P at a desired temperature.

The operation panel 41 is constituted by, for example, a liquid crystal display, an organic EL display, or an LED lamp and includes a display unit that displays an error message and the like and an operation unit (not-shown) constituted by various switches and the like.

The sheet feeding apparatus 5 sends the thermoplastic sheets P one by one intermittently according to control by a control unit 6. These thermoplastic sheets P are made capable of passing near an upper part of the shape forming unit 2 to be described later.

In addition, the thermoplastic resin sheets P have thermoplasticity. A material constituting this thermoplastic sheets P is not specifically limited. Examples of the material include polyethylene, polypropylene, polyolefin such as ethylene-vinyl acetate copolymer, modified polyolefin, polyamide (e.g., nylon 6, nylon 46, nylon 66, nylon 610, nylon 612, nylon 11, nylon 12, nylon 6-12, nylon 6-66), thermoplastic polyimide, liquid polymer such as aromatic polyester, polyphenylene oxide, polyphenylene sulfide, polycarbonate, polymethyl methacrylate, polyether, polyether ether ketone, polyetherimide, polyacetal, and various kinds of thermoplastic elastomer such as styrene, polyolefin, polyvinyl chloride, polyurethane, polyester, polyamide, polybutadiene, trans polyisoprene, fluororubber, and chlorinated polyethylene elastomer, or copolymer, blend, polymer alloy, and the like containing these kinds of elastomers. One of the above can be used or two or more of the above can be mixed and used.

Before a mold pattern is molded, a pre-print, in which the mold pattern is recognizable, may be applied to this thermoplastic sheet P by printing or the like.

Consequently, it is possible to recognize a mold pattern tactilely and visually (visual recognition of a mold pattern is improved). For example, it is possible to form a land mark, a map, and the like, which are easily recognized by not only those that are visually handicapped but also people with visual ability (people of normal health).

The sheet feeding device 5 includes a sheet feeding motor 51 that serves as a drive source for the sheet feeding device 5 and a sheet feeding roller 52 that rotates according to actuation of the sheet feeding motor 51.

The sheet feeding roller 52 is constituted by a driven roller 52_a_ and a drive roller 52_b_, which are opposed to each other vertically across a conveyance path of the thermoplastic sheet P (across the thermoplastic sheet P). The drive roller 52_b_ is coupled to the sheet feeding motor 51. Consequently, the sheet feeding roller 52 feeds a large number of thermoplastic sheets P set in the tray 53 to the apparatus body 10 (the tactile display 100) one by one or discharges the thermoplastic sheets P from the apparatus body 10 (the tactile display 100) one by one. Note that a structure, to which a supply cassette housing the thermoplastic sheets P is detachably attachable, may be adopted instead of the tray 53.

The control unit 6 applies molding processing to the thermoplastic sheet P by controlling the tactile display 100, the sheet feeding apparatus 5, and the like on the basis of, for example, a program stored in a storage unit in advance. In addition, the control unit 6 causes a display unit of the operation panel 41 to display an error message and the like or causes an LED lamp or the like to light or blink and causes respective units to execute processing corresponding thereto on the basis of depression signals of various switches inputted from the operation unit.

The control unit 6 drives a drive unit 3 to be described later of the tactile display 100 and forms a mold pattern in the shape forming unit 2 on the basis of data inputted from a host computer such as a personal computer (PC) or data of an image captured by a digital camera (DC), a scanner, or the like.

On the upper surface 12 of the apparatus body 10, a support 11, which supports the thermoplastic sheet P supplied by the sheet feeding roller 52, is provided in parallel to the upper surface 12. This support 11 is provided to be movable in a direction in which the support 11 approaches or separates from a display surface 24 to be described later of the tactile display 100 provided on the upper surface 12 (a direction of an arrow in FIG. 1).

This support 11 moves in the direction in parallel to the display surface 24 with a driving force of a not-shown motor. Consequently, it is possible to cause the thermoplastic sheet P to approach or separate from the display surface 24 easily and surely.

An opening 15 is provided in a portion of the support 11 corresponding to the display surface 24.

The apparatus body 10 includes a body inner chamber 14 and the tactile display 100 provided in the body inner chamber 14.

A duct line 54 is connected to the body inner chamber 14. The duct line 54 is connected to a fan (a decompressing unit) 55 serving as both a sucking unit and a cooling unit that exhausts the atmospheric gas in the body inner chamber 14.

When the fan 55 is operating, a decompressed state of the body inner chamber 14 is maintained (the atmospheric pressure is lowered). When the fan 55 stops, air (the atmosphere) is introduced from the outside via the duct line 54 and the decompressed state is released or relaxed.

In the decompressed state of the body inner chamber 14, the temperature in the body inner chamber 14 (apparatus body 10) falls to be lower than the ambient temperature because of adiabatic expansion.

A valve (not shown), which opens and closes the duct line 54, may be provided in the middle of the duct line 54. Consequently, it is possible to maintain the decompressed state easily.

The tactile display 100 includes the shape forming unit (three-dimensional display unit) 2 and the drive unit 3 that serves as a drive source for forming a mold pattern on the shape forming unit 2.

The tactile display 100 is a device that displays a mold pattern (image information such as a character (black letter, Braille) and a figure) by forming portions where the display pins 23 project and portions where the display pins 23 do not project on the display surface (a presentation surface) 24.

The tactile display 100 includes a base plate 91, a rack 92 set on the base plate 91, and a mounting table 93 serving as a tactile display mounting unit.

On the rack 92, a support unit 94 is set to be movable in an axial direction with respect to the rack 92. Inside the rack 92, a moving unit 7, which moves the support unit 94 in the axial direction, is provided.

As shown in FIG. 4, the moving unit 7 includes a lead screw (a feed screw shaft) 71 extending along the axial direction, a motor 72 that has a rotation shaft bonding (adhering) to an end of the lead screw 71, a cylindrical nut (a moving body) 75 having a through hole 751, through which the lead screw 71 is inserted, formed therein, and a support plate 73.

A female screw (threaded bore) is formed in the through hole 751 of the nut. This female screw is screwed with a male screw formed in the lead screw 71. This nut 75 is fastened to or integrated with the support plate 73.

The support unit 94 is connected with the nut 75 via this support plate 73.

With such a structure, when an output shaft of the motor 72 rotates in a predetermined direction, a driving force of the motor 72 is transmitted to the lead screw 71, and the lead screw 71 rotates in the predetermined direction. When the lead screw 71 rotates in the predetermined direction, the nut 75 moves in the axial direction along the lead screw 71, and the support plate 73 also moves in the axial direction with the nut 75.

In this way, the moving unit 7 can displace (move) the support unit 94 along the axial direction.

The drive unit 3 is fixed on the support unit 94.

The support unit 94 and the drive unit 3 are moved forward or backward in the axial direction integrally (synchronously) by the moving unit 7.

The mounting table 93 is provided on the base plate 91 via a column 931. This mounting table 93 is formed in a rectangular shape in plan view, substantially orthogonal to the axial direction in a longitudinal direction thereof, and provided substantially parallel to the base plate 91.

As shown in FIG. 5, a tabular frame 933 and a lower plate 932, which support the shape forming unit 2 from an upper side and a lower side, respectively, are provided on the mounting table 93. The shape forming unit 2 will be described in detail later.

The frame 933 is formed to substantially the same size (length and width) as the shape forming unit 2 in plan view. In this frame 933, a hole 63, through which a bolt 13 is inserted, is formed and an opening 61 is provided in a position corresponding to the display surface 24 of the shape forming unit 2.

A hole 64, through which the bolt 13 is inserted, is formed in the shape forming unit 2.

The hole 63 of the frame 933 and the hole 64 of the shape forming unit 2 are put on a not-shown screw hole provided in the lower plate 932, and the bolt 13 is inserted through the holes 63 and 64 to be screwed in and fastened to the screw hole, whereby the shape forming unit 2 is supported.

The lower plate 932 is fixed to the mounting table 93 and, as shown in FIG. 5, in the lower plate 932 and the mounting table, an opening 62 is provided in a position corresponding to the display surface 24 of the shape forming unit 2.

The shape forming unit 2 includes plural display pins 23 serving as tactile elements for displaying tactile information, a guide section (a guide unit) 21 that supports the plural display pins 23 to be movable, and a sheet-like lock sheet (lock member) 25.

As shown in FIG. 2, in this embodiment, an external shape (overall shape) of the guide section 21 is a square pole shape (rectangular parallelepiped shape). In this guide section 21, plural passages (holes) 22, which pierce through the guide section 21 in the vertical direction in FIG. 6, are provided.

In this embodiment, each of the passages 22 is formed substantially in a columnar shape and an inner diameter of a tip 223 thereof is formed smaller than an inner diameter of other portions of the passage 22.

Note that the respective passages 22 are provided to be parallel to each other. In addition, the respective passages 22 are formed at equal intervals in a row direction and a column direction in a matrix shape in plan view.

A pitch of the respective passages 22 arranged in this way is set appropriately. For example, it is preferable to set the pitch to about 0.5 mm to 3 mm.

Consequently, it is possible to form a fine mold pattern.

Note that it is preferable that the inner diameter of each of the passages 22 is smaller than an inner diameter of each bobbin 32 to be described later and larger than an external shape of a small diameter section 332 of a launch core 33 to be described later.

The inner diameter of the passage 22 and an outer diameter of each of the display pins 23 are set with a slight gap (clearance) such that the respective display pins 23 can move smoothly without looseness.

This guide section 21 is adapted such that the display pins 23 are inserted (set) into the respective passages 22 movably and functions as a guide for regulating moving directions of the respective pins 3. In other words, the guide section 21 supports the respective display pins 23 such that the display pins 23 can move only in a longitudinal direction thereof.

Here, the longitudinal direction of the display pins 23 is a concept including not only the vertical direction in the case in which the display pins 23 is linear but also, for example, a direction along a pattern of the display pins 23 in the case in which the display pins 23 are curved or bent.

A surface of the guide section 21 on an upper side in FIG. 6 constitutes the display surface 24. A mold pattern is formed by projecting predetermined display pins 23 from this display surface 24. The mold pattern is displayed by contact sections 27 provided at tips of these display pins 23.

This display surface 24 and the upper surface 12 of the apparatus body 10 are located on a substantially identical plane.

Consequently, the display pins 23 can project to the outside from the inside of the body inner chamber via the passages 22.

In addition, it is possible to suck (introduce) external air into the body inner chamber 14 via the passages 22.

A material constituting the guide section 21 is not specifically limited and, for example, various kinds of metal, various kinds of resin, various kinds of ceramics, and the like can be used.

A gap 26, through which a lock sheet 25 is inserted, is provided in the center in the vertical direction in FIGS. 6 and 7 of each of the passages 22 of the guide section 21. This gap 26 is provided to be parallel to the display surface 24.

Each of the display pins 23 has a pin body 28. In the pin body 28, a first convex section 231, a second convex section 232, and a third convex section 233 (second engagement section) are formed in this order from a base end side to a tip side of the pin body 28.

The pin bodies 28 are bar-like members, which have a circular shape on a cross section thereof, and are formed to have an identical length and an identical outer diameter (diameter).

In portions of the pin body 28 where the first convex section 231, the second convex section 232, and the third convex section 233 are formed, outer diameters thereof are larger than that of the pin body 28. In addition, the outer diameter of the convex section 233 is set larger than those of the convex sections 231 and 232.

It is preferable that the second convex section 232 is not rough (e.g., smooth) in an outer peripheral surface (a side surface) thereof. Consequently, the second convex section 232 can move smoothly with respect to an edge 252 to be described later.

The first projection 231 and the second projection 232 are arranged a predetermined distance apart from each other. Consequently, a concave section 234 (a first engagement portion) is formed around a peripheral direction of the pin body 28. A width of a bottom portion 235 of this concave section 234 is set substantially the same as a length in a thickness direction of the lock sheet 25 or slightly larger than the length.

A length of each of the display pins 23 is set to a dimension with which the display pin 23 projects from the display surface 24 when the display pin 23 is held (positioned) in a display position and does not project from the display surface 24 when the display pin 23 is held in a basic position (a non-display position). Note that the display position and the basic position will be described later.

Examples of a material constituting the display pins 23 include iron, cobalt, and nickel.

An overall shape of the lock sheet 25 is a rectangular shape in plan view, and plural openings 251 are provided in the lock sheet 25. The respective openings 251 are provided in association with the respective display pins 23, and the respective display pins 23 are inserted through the respective openings 251. A diameter of each of the openings 251 is formed smaller than an outer diameter of the third convex section 233. In addition, it is preferable that a diameter of each of the openings 251 is formed larger than that of the second convex section 232.

Consequently, it is possible to prevent the display pins 23 from coming off the shape forming unit 2.

A main part of a holding unit is formed by the lock sheet 25, the third convex section 233, and the concave section 234.

The lock sheet 25 of this embodiment has moderate elasticity and moderate rigidity. In addition, an edge 252 facing the respective openings 251 is formed in the lock sheet 25.

A material constituting this lock sheet 25 is not specifically limited and examples of the material include various kinds of resin.

A coil spring 9 is set inside the passage 22 and on an outer peripheral side of the tip of the display pin 23. In other words, the tip of the display pin 23 is inserted into the inner side of the coil spring 9.

A tip of the coil spring 9 is in abutment against a tip 212 of the guide section 21 and a base end of the coil spring 9 is in abutment against the third convex section 233.

The coil spring 9 is a member for biasing the display pin 23 in a direction from the display position to the basic position, that is, a base end direction. When the display pin 23 moves from the display position to the basic position, the coil spring 9 supports the movement.

When the display pin 23 is located in the basic position, the coil spring 9 prevents the display pin 23 from projecting from the display surface 24.

In the display position, the coil spring 9 is set in a compressed state and the display pin 23 is biased to the base end side by an elastic force of the coil spring 9.

As shown in FIG. 6, in a position where the display pin 23 does not project from the display surface (a non-display state), the edge 252 of the lock sheet 25 comes into abutment against the third convex section 233 and engages with the third convex section 233 to thereby hold the display pin 23 to prevent movement of the display pin 23 to the base end side and allow the display pin 23 to move to the tip side.

At this point, the lock sheet 25 is biased to press a side 236 of the second convex section 232 to the right direction in FIG. 6. A position of the display pin 23 in this state will be referred to as a basic position.

A unit for biasing the lock sheet 25 is not specifically limited, and a publicly known conventional unit can be used.

As shown in FIG. 7, in a position where the display pin 23 projects from the display surface 24 (a display state), the edge 252 of the lock sheet 25 is inserted into the concave section 234 of the display pin 23 and engages with the first convex section 231 and the second convex section 232 to thereby hold the display pin 23 to prevent movement of the display pin 23 in both the direction to the base end side and the direction to the tip side. A position of the display pin 23 in this state is referred to as a display position.

Note that one display pin 23 of the shape forming unit 2 and portions of the guide section 21 of the shape forming unit 2 and the lock sheet 25 corresponding to the display pin 23 constitute one display unit 20.

In FIGS. 6 and 7, the drive unit 3 is provided below the shape forming unit 2 such that the respective display pins 23 of the shape forming unit 2 displaces (moves) in a longitudinal direction (a vertical direction in FIG. 6) with a driving force of this drive unit 3 to be held (positioned) in the display position by the lock sheet 25. Consequently, tactile information according to an unevenness pattern is displayed by the contact sections 27 of the plural display pins 23.

Figure 9:
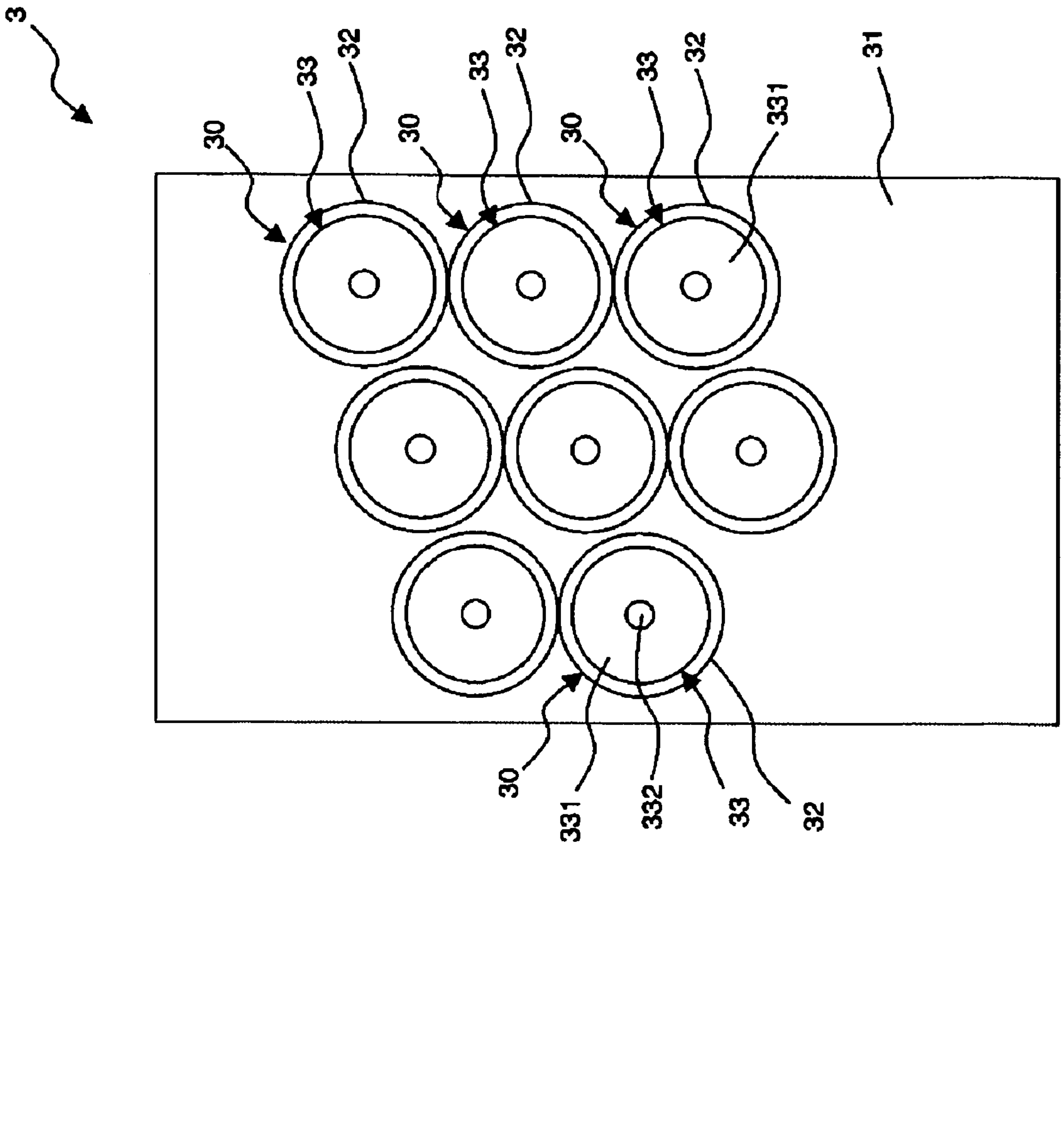
FIG. 9 is a plan view (a top view) showing the drive unit of the tactile display in FIG. 3.
Figure 10:
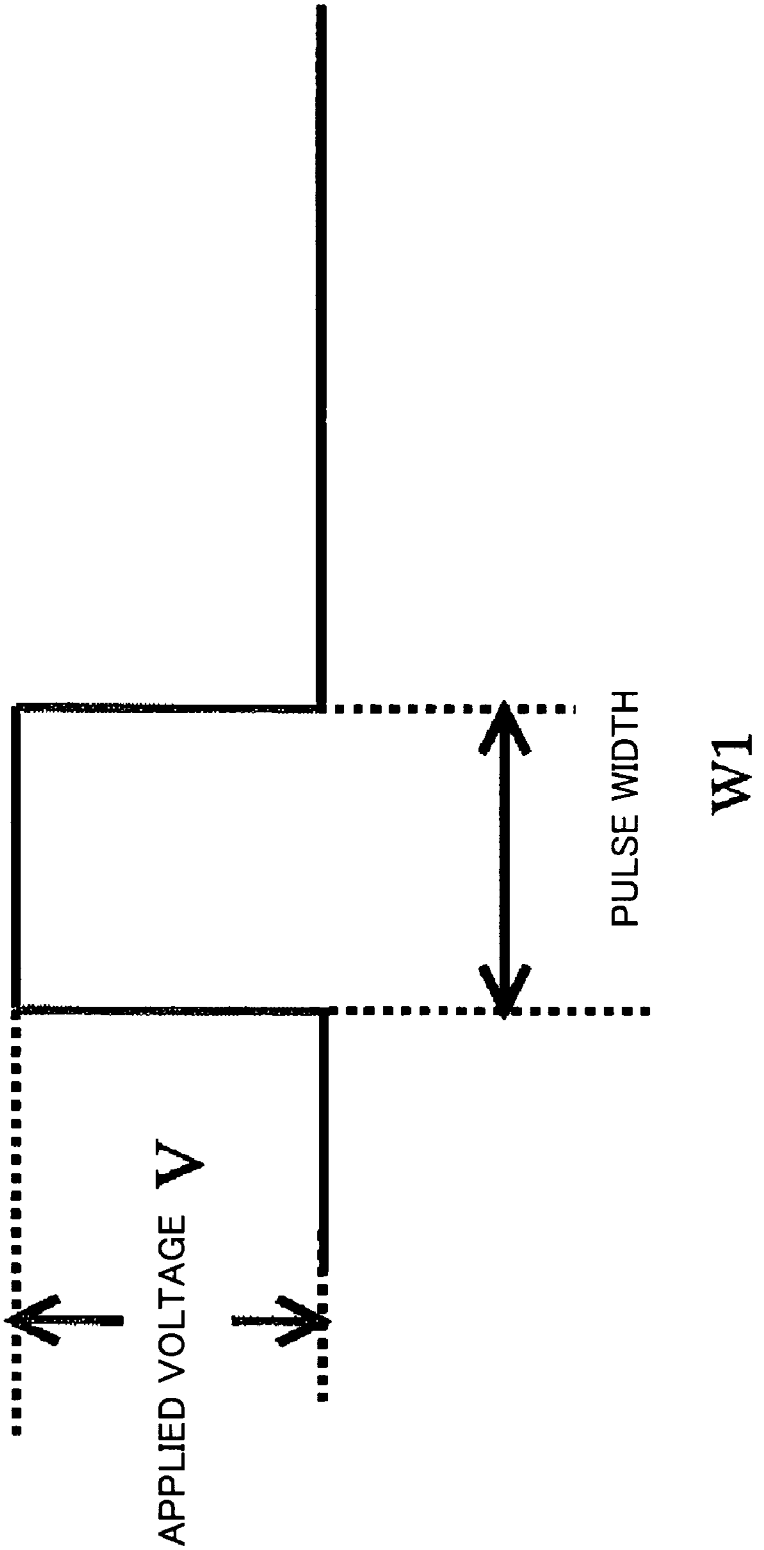
FIG. 10 is a diagram explaining a launch pulse of the tactile display in FIG. 3.

FIG. 8 is a perspective view showing the drive unit of this embodiment, FIG. 9 is a plan view (a top view) showing the drive unit, and FIG. 10 is a diagram explaining a launching pulse. Note that, in FIG. 8, a width (an interval) between bobbins adjacent to each other is shown with emphasis.

The drive unit 3 is constituted by plural driving units 30 and a guide section 31 that supports the respective driving units 30. In FIG. 8, eight driving units 30 are provided.

The respective driving units 30 have bobbins (support sections) 32 and launch cores 33, and solenoids 34.

In this embodiment, the respective bobbins 32 assume a cylindrical shape (a columnar shape) having a bottom (cross sections of the respective bobbins 32 assume a circular shape) and the respective bobbins 32 are formed with an identical inner diameter. In addition, in this embodiment, the respective bobbins 32 are provided to be parallel to each other. Further, in this embodiment, in FIG. 9, plural columns of the bobbins 32 formed linearly at equal intervals are formed in the vertical direction and the bobbins 32 of adjacent columns are arranged to be shifted from each other in the vertical direction in FIG. 9. In other words, the bobbins 32 are arranged in a zigzag. A pitch of the respective bobbins 32 arranged in a column shape is set appropriately according to the pitch or the like of the passages 22 of the shape forming unit 2 described above. It is preferable to set the pitch to about 1 mm to 3 mm.

The bobbins 32 are adapted such that the launch cores 33 are mounted (set) movably in the bobbins 32. The bobbins 32 serve as guides for regulating moving directions of the launch cores 33, respectively. In other words, the bobbins 32 support the launch cores 33 such that the launch cores 33 can move only in the longitudinal direction (the vertical direction in FIG. 8), respectively.

The respective launch cores 33 are formed with an identical length and an identical outer diameter (diameter). In addition, the respective launch cores 33 is formed of a magnetic substance and have core bodies 331, which are bar-like member assuming a circular shape in a cross section, and small diameter sections 332.

Each of the small diameter sections 332 is a bar-like member having an outer diameter smaller than that of the core body 331 and is provided on a tip side of the core body 331 (an upper side in FIG. 6).

Note that the small diameter sections 332 do not have to be provided.

A material constituting the launch cores 33 is not specifically limited. Examples of the material include stainless steel.

The solenoid 34 is formed in substantially a cylindrical shape and set with a solenoid coil 341 wound around to surround a periphery in the center of the bobbin 32 such that center axis thereof substantially coincide with center axis of the bobbin 32.

An applied voltage and an application time of a pulse (a voltage) from the respective driving units 30 to the respective solenoids 34 are controlled by a control unit.

When each of the driving units 30 is in a position (described later) corresponding to a desired display pin 23, the control unit applies a pulse having a width (application time) W1 and an applied voltage V shown in FIG. 10 to the solenoid coil 341. The solenoid 34 generates a magnetic field with this pulse. A force for launching the launch core 33 upward acts on the launch core 33 according to the magnetic field generated by the solenoid (solenoid coil 341). An operation for moving the launch core 33 upward in FIG. 6 (a launch operation) is started, and the launch core 33 collides with the base end of the display pin 23. It is preferable that an application time and an applied voltage of a pulse at this point are set in advance such that the lock sheet 25 engages with the concave section surely.

Here, an application time for applying a voltage to the solenoid 34 once (one pulse) is not specifically limited. However, it is preferable that the application time is short, for example, in order to reduce a display time. Here, the application time is set to about 3 to 5 msec.

The operation will be hereinafter referred to as a launch operation.

In addition, an applied voltage to the solenoid coil 341 (the solenoid 34) is not specifically limited. However, preferably, the applied voltage is about 0.1 to 5V and, more preferably, the applied voltage is about 0.5 to 1.5V. By setting the applied voltage to the solenoid coil 341 to the range, there is an advantage that it becomes possible to save power consumption.

It is preferable that the solenoid 34 is set to surround the tip side of the launch core 33 (the upper side in FIG. 6) when the solenoid 34 is in an initial position and surround the base end side of the launch core 33 when the launch core 33 collides with the display pin 23. Consequently, it is possible to move the launch core efficiently.

Here, the initial position refers to a position of the launch core 33 in a state in which the core body 331 is in abutment against the bottom of the bobbin 32.

A material constituting such a solenoid coil 341 is not specifically limited as long as the material is a conductive material such as copper, silver, or gold.

Next, a detailed operation (action) of formation (drawing) of a mold pattern using the tactile display 100 will be explained using FIGS. 11 to 13.

Note that, in the following explanation, since structures and actions of the respective display unit 20 of the shape forming unit 2 and the respective driving units 30 of the drive units 3 are the same, respectively, one of the display units 20 and one of the driving units 30 will be explained as representative ones.

Note that, as shown in FIG. 13, a moving member 8 is constituted by the support unit 94 and the drive unit 3.

First, the moving member 8 moves forward in an axial direction (a right side in FIG. 16) from a position in FIG. 13(*a*).

Next, when the drive unit 3 reaches the lower part of the display pin 23 to be projected, drive of the motor 72 is temporarily stopped and the pulse shown in FIG. 10 is applied to the solenoid 34 on the basis of a signal from the control unit to excite the solenoid 34. The launch core 33 is launched by a magnetic attraction force generated in the solenoid 34.

Next, as shown in FIG. 11, the launched launch core 33 collides with the display pin 23. Consequently, the display pin 23 moves upward. Next, when the concave section 234 moves to a position corresponding to the edge 252, since the lock sheet 25 is biased in the right direction, the edge 252 moves in a direction of an arrow in FIG. 12 by a biasing force of the lock sheet 25, inserted into the concave section 234, and engages with the concave section 234, whereby the lock sheet 25 holds the display pin 23 in the display position (see FIGS. 7 and 13(*b*)). On the other hand, after the collision, the launch core 33 falls by its own weight and returns to the initial position.

By applying the operation described above to predetermined pins 23, a mold pattern is displayed in the shape forming unit 2 (see FIG. 13(*c*)).

On the other hand, when the mold pattern is erased, the lock sheet 25 is moved slightly in the left direction in FIG. 6.

Here, "slightly" means that a state in which the lock sheet 25 is put on the third convex section 233 in plan view is maintained.

Consequently, the edge 252 engaging with the concave section 234 is released from the engagement with the concave section 234, and the display pin 23 is moved in the base end direction by a biasing force of the coil spring 9. Thereafter, the third convex section 233 collides against the lock sheet 25. Then, the lock sheet 25 engages with this third convex section 233 to hold the display pin 23, whereby the display pin 23 returns to (is located in) the basic position.

FIGS. 14 to 18 are plan views (top views) showing a state in which driving units launch the launch cores to desired display units.

Note that, in FIGS. 14 to 18, as an example, the drive unit 3 has the driving units 30 of three columns (30*a* to 30*c*) and the shape forming unit 2 has the passages 22 of 8 rows and 10 columns (A11 to A88).

An operation (action) for forming a mold pattern of the tactile display 100 will be explained.

Note that, in the following explanation, as an example, a pitch of the respective passages 22 is set to 1 mm and a pitch of respective bobbins is set to 3 mm.

First, the drive unit 3 is moved forward in the axial direction by the moving unit 7.

Figure 15:
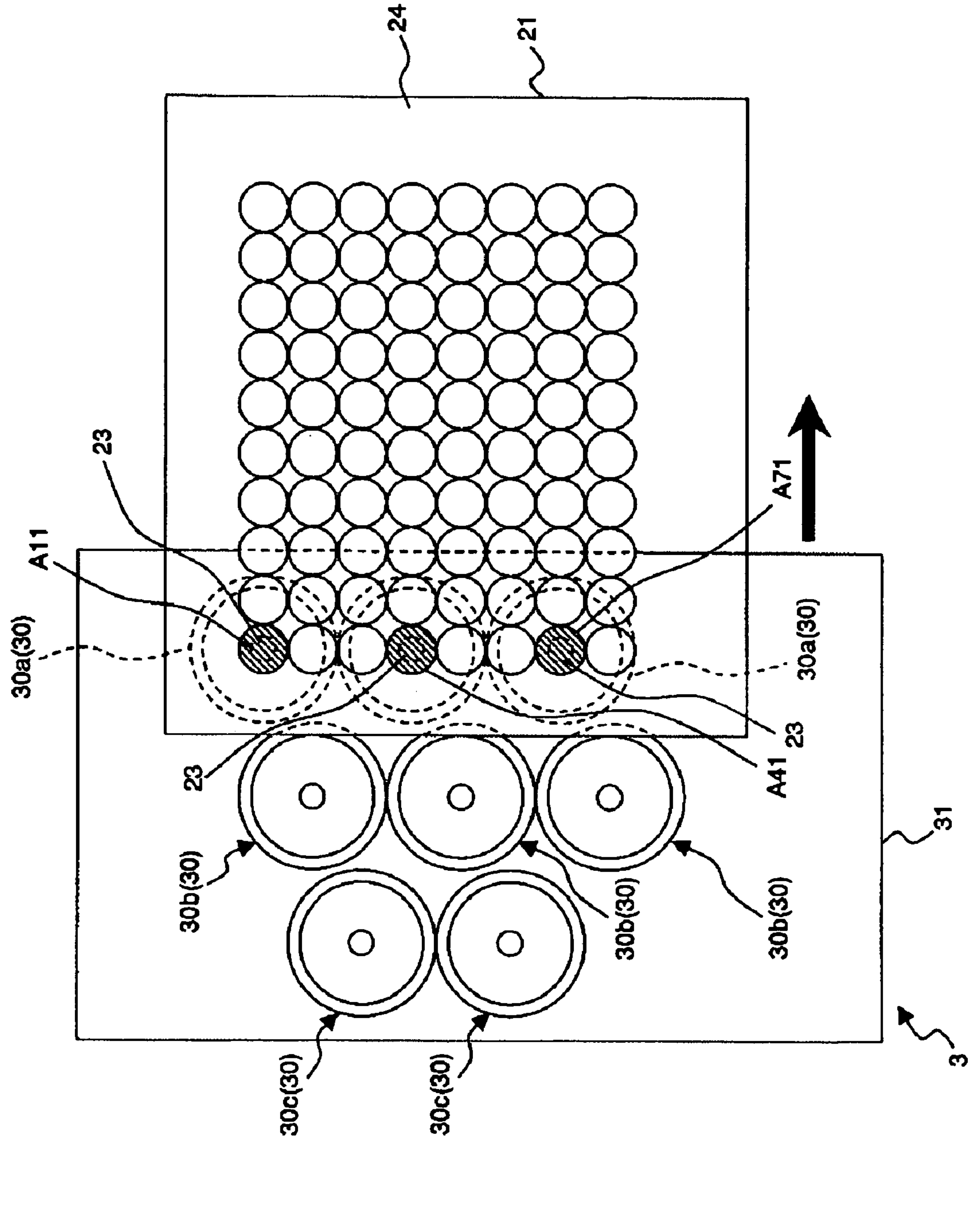
FIG. 15 is a plan view (a top view) showing a state in which the driving units launch the launch cores to the desired display units.

When the respective driving units 30*a* reach a lower part of first column (A11 to A81) of the passage 22 (in this embodiment, when centers of diameters of the launch cores 33 of the respective driving units 30*a* and the display pins 23 of the first column of the passage substantially coincide with each other), the forward movement of the drive unit 3 stops for a predetermined time and, as shown in FIG. 15, the respective driving units 30*a* starts a launch operation (drive) for the corresponding display pins 23 of the first column. In this operation, the respective driving units 30*a* selectively drives A11, A41, and A71 on the basis of the display data described above to determine a position (a projected position or a basic position) of the respective display pins 23 corresponding to the respective driving units 30. When this operation is completed, the drive unit 3 moves forward in the axial direction and the driving units 30*a* reach a lower part of the passage 22 of the next column (A12 to A82). After that, in the same manner, the driving units 30*a* apply the launch operation to the display pins 23 corresponding to the passage 22 of the second column (A12, A42, and A72) and the passage 22 of the third column (A13, A43, and A73).

Figure 16:
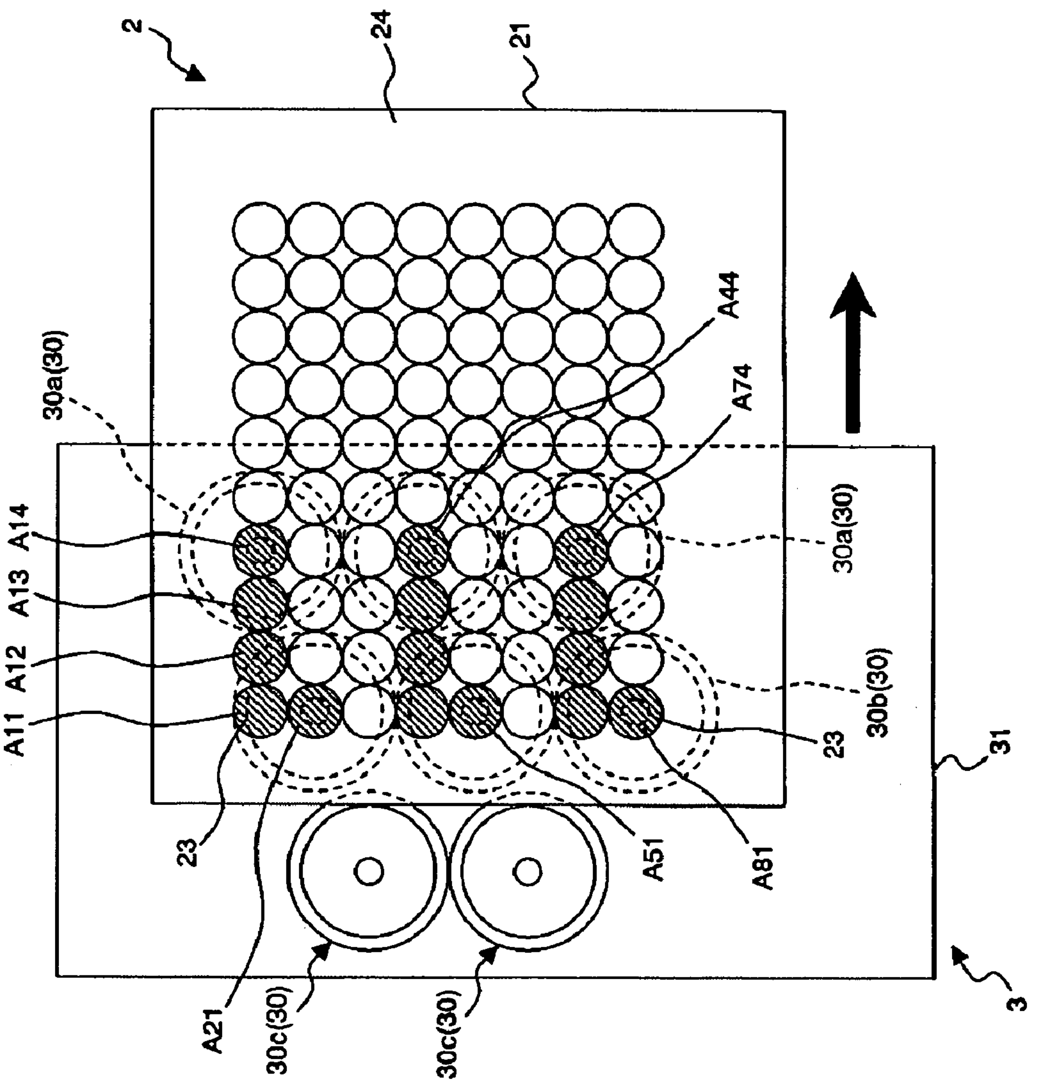
FIG. 16 is a plan view (a top view) showing a state in which the driving units launch the launch cores to the desired display units.
Figure 17:
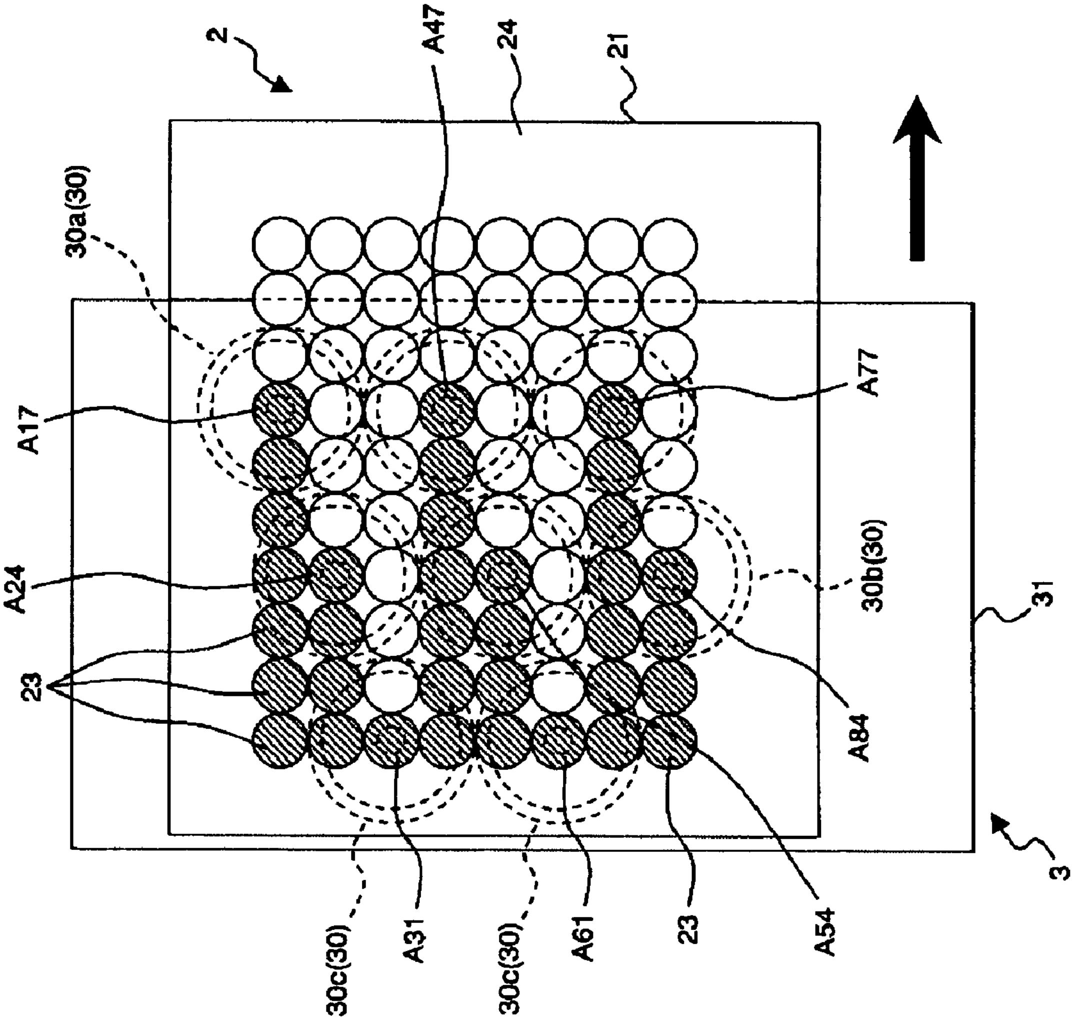
FIG. 17 is a plan view (a top view) showing a state in which the driving units launch the launch cores to the desired display units.
Figure 18:
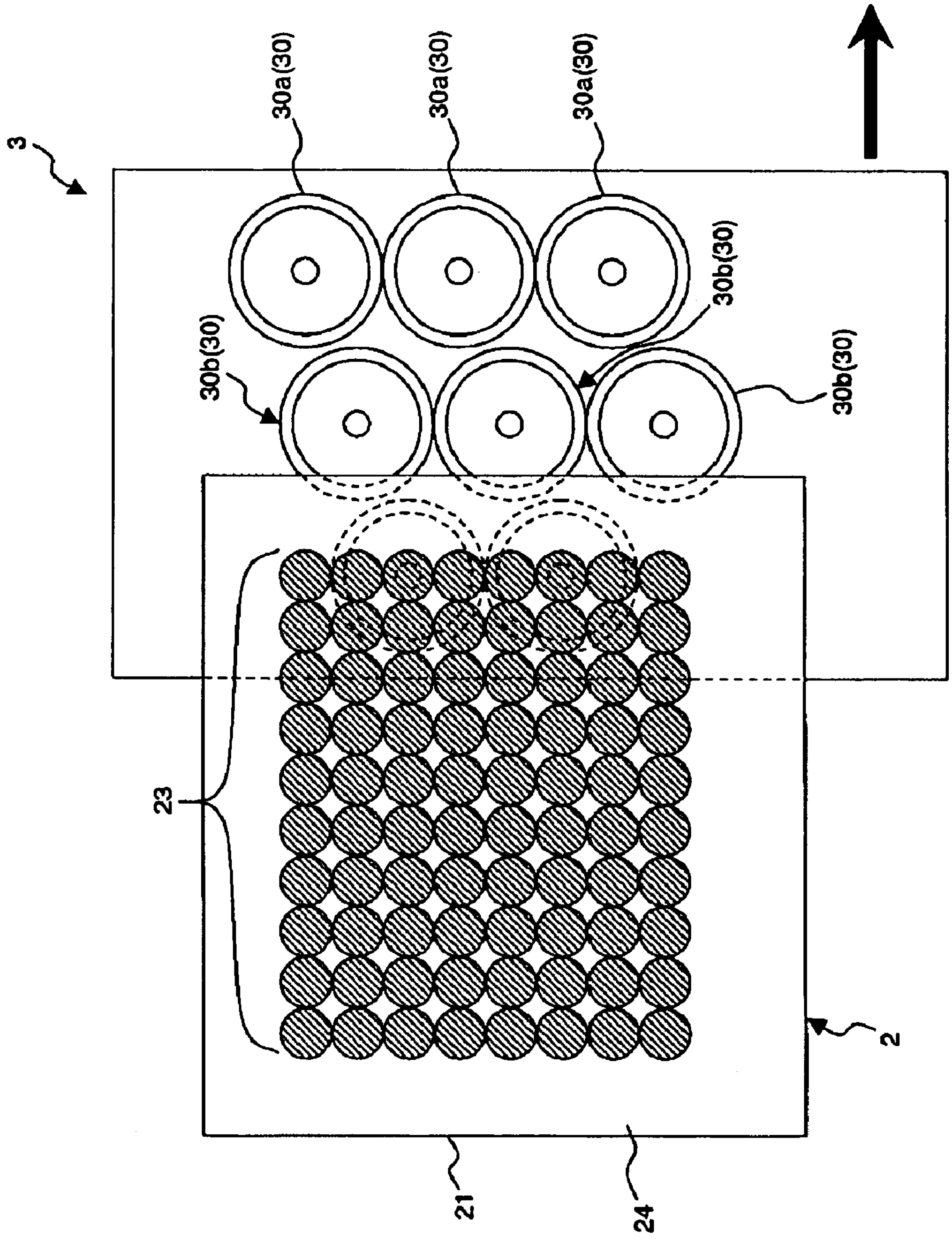
FIG. 18 is a plan view (a top view) showing a state in which the driving units launch the launch cores to the desired display units.

When the respective driving units 30*a* reach a lower part of the passage 22 of the fourth column and the respective driving units 30*b* reaches a lower part of the first column of the passage 22, as shown in FIG. 16, the respective driving units 30*a* apply the launch operation to A14, A44, and A74 and the respective driving units 30*b* apply the launch operation to the A21, A51, and A81. After that, in the same manner, the respective driving units 30*a* and 30*b* perform the launch operation. Thereafter, when the passage 22 of the first column reach a position above the respective driving units 30*c*, as shown in FIG. 17, the respective driving units 30*a* apply the launch operation to A17, A47, and A77 and, at the same time, the respective driving unit 30*b* apply the launch operation to A24, A54, and A84 and the driving units 30*c* apply the launch operation to A31 and A61. After that, in the same manner, the respective driving units 30*a*, 30*b*, and 30*c* perform the processing. Consequently, as shown in FIG. 18, the drive unit 3 can selectively drive all the display pins 23 of the shape forming unit 2. The drive unit is controlled, whereby the predetermined display pins 23 can form (draw) a mold pattern on the display surface 24.

Next, an action of the three-dimensional hard copy apparatus 1 using the tactile display 100 described above will be explained.

First, for example, a user places the thermoplastic sheet P on the tray 53 and operates the operation unit while looking at the operation panel 41, whereby an operation of the control unit 6 is started.

According to an instruction of the control unit 6, the drive unit 3 is driven selectively to move predetermined display pins 23 and form a mold pattern on the display surface 24 of the shape forming unit 2. Next, the sheet feeding roller 52 is rotated to supply the thermoplastic sheet P onto the support 11.

Figure 19:
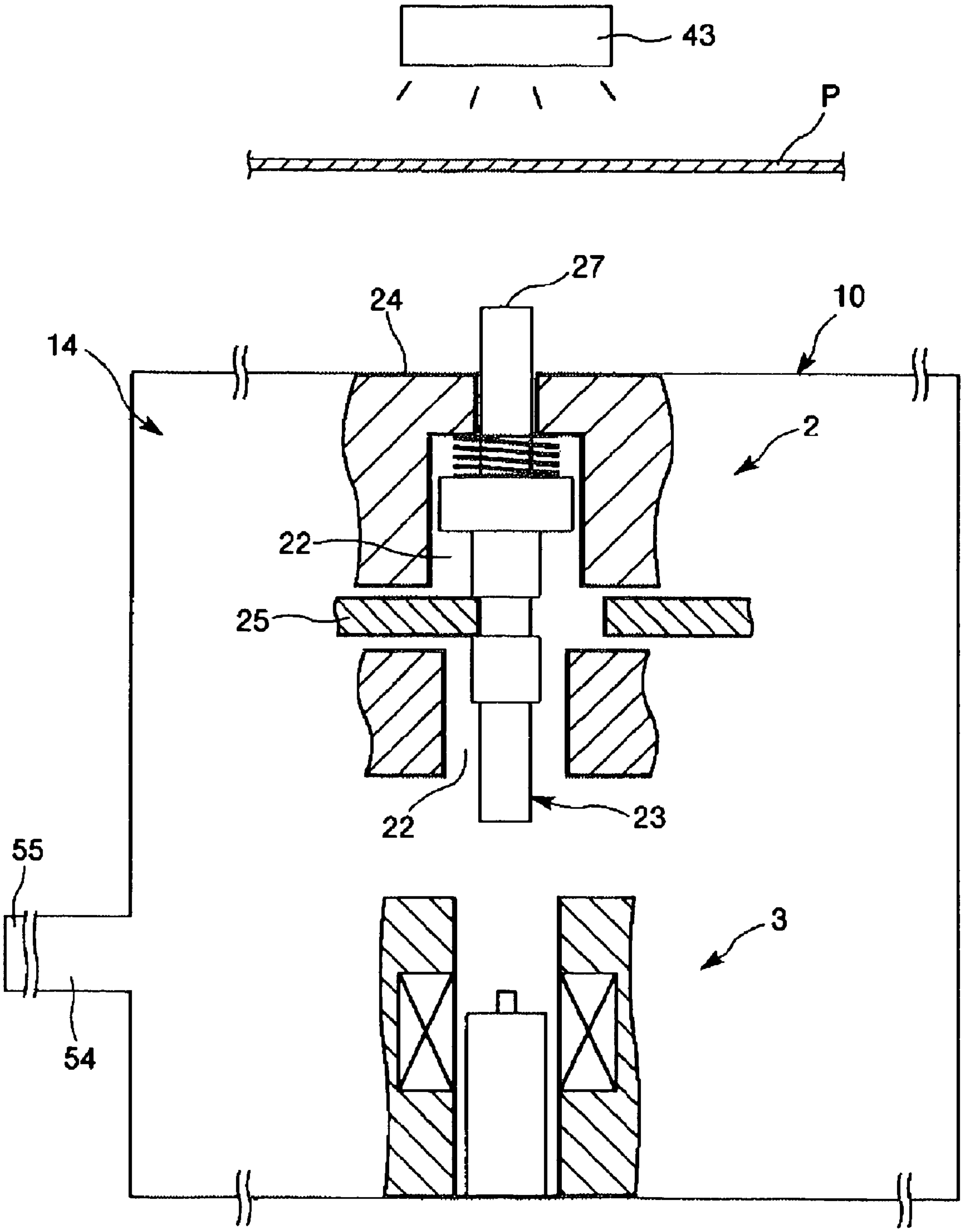
FIG. 19 is a schematic diagram showing an operation of the three-dimensional hard copy apparatus in FIG. 1.

Next, the halogen lamp 43 is operated to heat the thermoplastic sheet P until the thermoplastic sheet P comes into a plastically deformable state (see FIG. 19).

The thermoplastic sheet heated to come into the plastically deformable state will be hereinafter referred to as a thermoplastic sheet P2.

Figure 20:
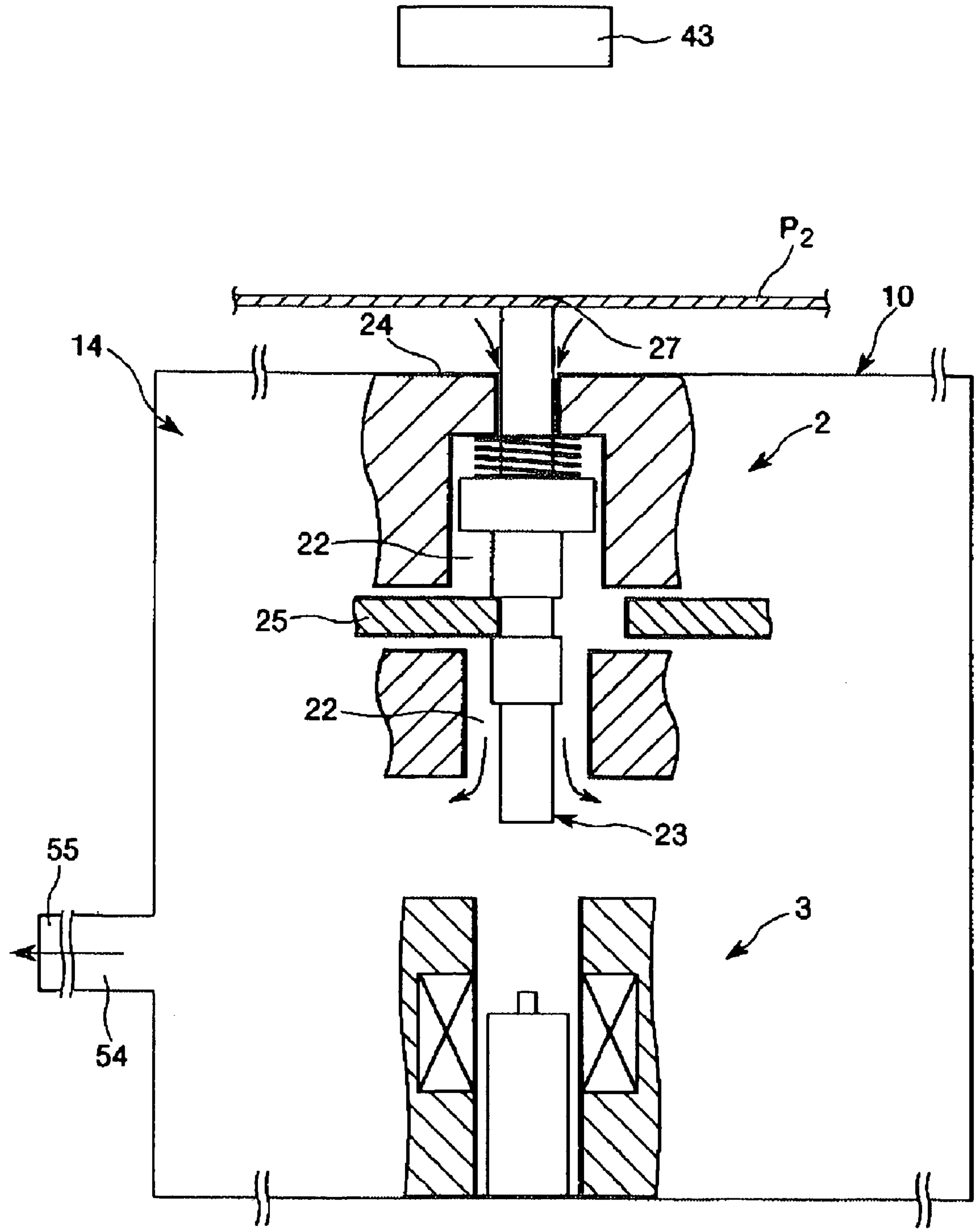
FIG. 20 is a schematic diagram showing an operation of the three-dimensional hard copy apparatus in FIG. 1.

Then, the support 11 is moved in a downward direction (a direction in which the support 11 is caused to approach the upper surface 12 of the apparatus body 10) to be brought into abutment against the upper surface 12. Consequently, the display pins 23 forming the mold pattern adhere to a lower surface of the thermoplastic sheet P2. Thereafter, the fan 55 is driven, whereby the inside of the body inner chamber 14 is decompressed to attract the thermoplastic sheet P2 adhering to the display pins 23 from the body inner chamber 14 side via the passage 22 (see FIG. 20).

Figure 21:
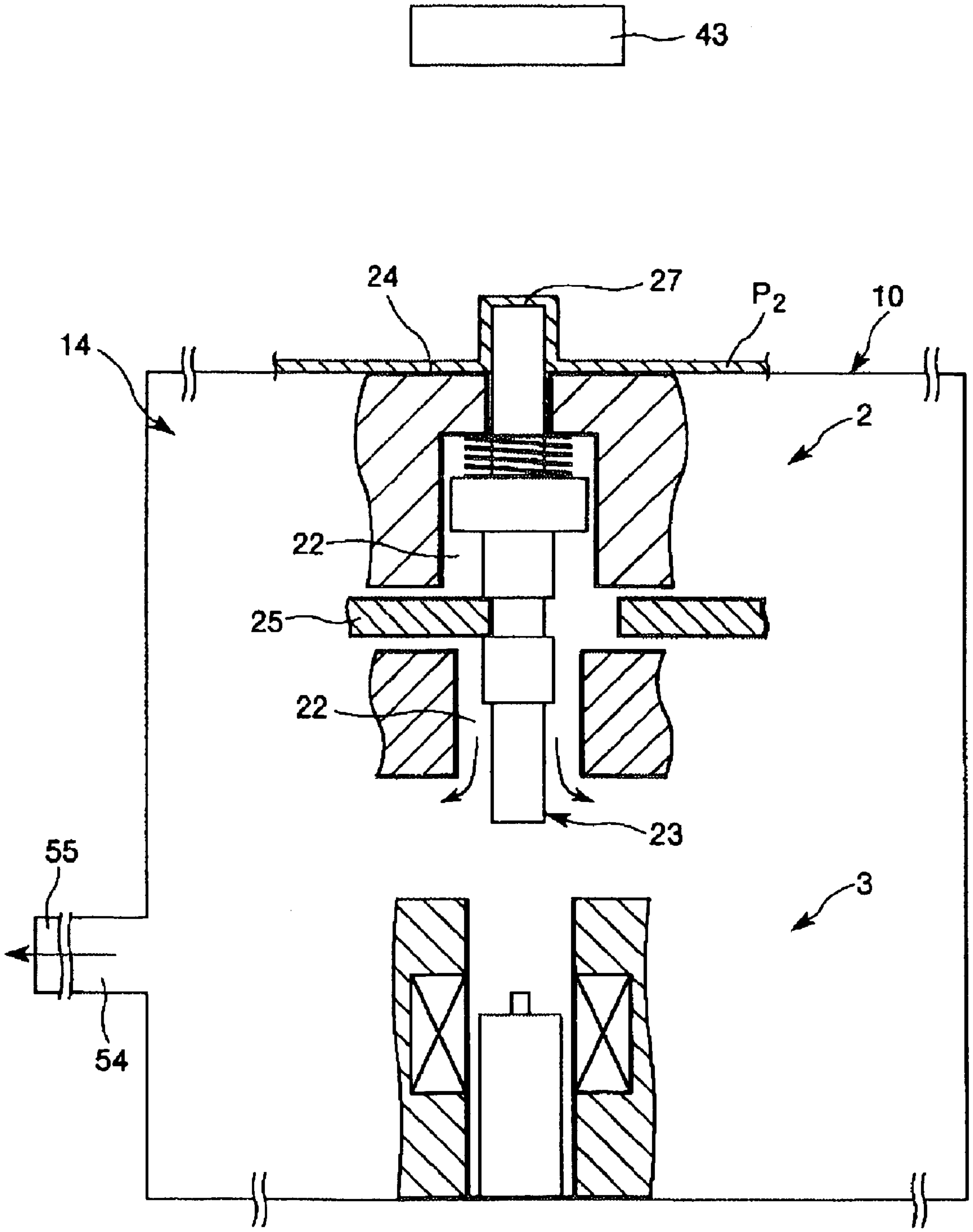
FIG. 21 is a schematic diagram showing an operation of the three-dimensional hard copy apparatus in FIG. 1.

Consequently, the thermoplastic sheet P2 comes into press contact with the display pins 23 and the mold pattern is formed on the thermoplastic sheet P2 (see FIG. 21).

Moreover, the fan 55 is driven for a predetermined time, whereby the inside of the body inner chamber 14 is decompressed and cooled. Consequently, a molded sheet obtained by cooling the thermoplastic sheet P2 to a desired temperature is completed.

Next, the support 11 is moved in an upper direction (a direction in which the support 11 separates from the upper surface 12) to lift the molded sheet and, then, the sheet feeding roller 52 is rotated to discharge the molded sheet.

Thereafter, in molding another thermoplastic sheet P, the same operation as above is repeated.

In ending the molding operation, the lock sheet 25 is moved in a direction opposite to the moving direction, whereby the display pin 23 is returned to the basic position.

As described above, according to this three-dimensional hard copy apparatus 1, it is possible to form a fine mold pattern using the shape forming unit 2 and, by bringing the shape forming unit 2 and the thermoplastic sheet P2 into press contact with each other, it is possible to mold a molded sheet of a pattern of a shape matching an unevenness pattern of the shape forming unit 2.

Since a mold pattern is displayed on the shape forming unit on the basis of various electronic data such as image data, it is possible to rewrite the pattern. Thus, it is easy to change the unevenness pattern and, for example, there is an advantage that it is possible to cope with molding of a small number of sheets at low cost.

Since the three-dimensional hard copy apparatus 1 is simple in structure and can be reduced in size, there is an advantage that it is possible to easily realize not only an application for industrial use but also an application for household use.

Since it is possible to realize a display density, for example, as low as about 1 mm, it is possible to perform Braille display similar to the standard of paper Braille that is generally used. By applying a sheet created by three-dimensional hard copy of the invention to Braille display, it is possible to perform Braille display that is durable compared with the paper Braille.

Since the thermoplastic P is used as an object to be molded, the thermoplastic sheet P is brought into the plastically deformable state by applying predetermined heating to the thermoplastic sheet P, and it is possible to mold the thermoplastic sheet P easily.

By decompressing the body inner chamber 14 using the fan 55 and attracting the thermoplastic sheet P2 from the holes, it is possible to easily bring the display pins 23 and the thermoplastic sheet P2 into press contact with each other and easily perform molding on the thermoplastic sheet P2 and cooling of the thermoplastic sheet P (P2) simultaneously.

Note that, although the fan 55 is used as a decompressing unit in this embodiment, the invention is not limited to this and, for example, a vacuum pump or the like may be used.

In the explanation of this embodiment, the solenoid 34 is used as a drive unit, the drive unit 3 is moved relatively to the shape forming unit 2, and the display pin 23 is moved from the basic position to the display position. However, the invention is not limited to this and, for example, it is also possible that a male screw is screwed (turned) to be provided on a peripheral surface of a rotation shaft of a motor (a motor shaft) corresponding to each display pin, a female screw is screwed (turned) to be provided in each of the display pins 23, and the drive unit is constituted to move the display pin 23 from the basic position to the display position by screwing the male screw and the female screw to each other.

In this case, it is possible to position a display pin not only in the basic position and the display position but also a desired position in a moving direction of the display pin. Thus, it is possible to mold an object like a contour using display pins projected by different lengths.

Although a thermoplastic sheet is used as an object to be molded in this embodiment, the invention is not limited to this and, for example, it is possible to use a thermoset sheet or the like having a thermosetting property. In that case, it is possible to bring an uncured thermoset sheet into abutment against a shape forming unit with an attracting unit in advance to form a mold pattern on the uncured sheet and, then, heat the sheet with a heating unit to thereby mold the sheet.

Although the thermoplastic sheet P is caused to approach the shape forming unit by the support 11 in this embodiment, the invention is not limited to this and, for example, the thermoplastic sheet P may be caused to approach the shape forming unit using an attracting unit.

The three-dimensional hard copy apparatus of the invention has been explained on the basis of the embodiment shown in the figures. However, the invention is not limited to this embodiment and the structures of the respective units can be replaced with arbitrary structures having similar functions. In addition, other arbitrary components may be added to the invention.

What is claimed is:

1. A three-dimensional hard copy apparatus comprising:

a shape forming unit that is capable of forming a predetermined pattern and includes:

a display surface; and plural pins which are in contact with a sheet-like object to be molded, have contact sections provided on the display surface side at tips thereof, and are provided to be movable with respect to the display surface;

a drive unit that selectively drives the plural pins;

a holding unit that respectively holds positions of the plural pins; and a press-contact unit that moves one of the object to be molded and the shape forming unit with respect to the other in a direction in which the object to be molded and the shape forming unit approach each other and brings the object to be molded and the shape forming unit into press contact with each other;

wherein the three-dimensional hard copy apparatus forms the predetermined pattern with the shape forming unit, holds the plural pins with the holding unit, and brings the object to be molded and the shape forming unit into press contact with each other with the press contact unit to form a pattern of a shape matching the predetermined pattern formed by the shape forming unit on the object to be molded, and wherein the press contact unit is adapted to attract the object to be molded to the plural pins by decompression so that the object to be molded is brought into press contact with the shape forming unit.

2. A three-dimensional hard copy apparatus according to claim 1, wherein the object to be molded has thermoplasticity, and the three-dimensional hard copy apparatus comprises a heating unit that heats the object to be molded.

3. A three-dimensional hard copy apparatus according to claim 1, further comprising a supply and discharge unit that supplies and discharges the object to be molded to and from the shape forming unit.

4. A three-dimensional hard copy apparatus according to claim 1, wherein the direction in which the object to be molded and the shape forming unit approach each other and a longitudinal direction of the display pins substantially coincide with each other.

5. A three-dimensional hard copy apparatus according to claim 1, wherein the shape forming unit has plural holes that are arranged in a matrix shape and through which the display pins are inserted and slide freely and includes a guide section that supports the pins.

6. A three-dimensional hard copy apparatus according to claim 1, wherein the press contact unit attracts the object to be molded in a direction in which the object to be molded approaches the shape forming unit to bring the object to be molded into press contact with the shape forming unit.

7. A three-dimensional hard copy apparatus according to claim 1, wherein the holding unit selectively holds the plural display pins in a display position where the plural display pins project from the display surface and a basic position where the display pins do not project from the display surface.

8. A three-dimensional hard copy apparatus according to claim 7, wherein:

the display pins have first engagement sections and second engagement sections; and the holding unit includes a lock member that engages the first engagement sections of the display pins in the display position to hold the display pins in an unmovable state in both directions of the moving direction and release the engagement to release the display pins, and engages the second engagement sections of the display pins in the basic position to hold the display pins in a movable state in the direction to the display position.

9. A three-dimensional hard copy apparatus according to claim 8, wherein the lock member includes plural openings through which the plural display pins are respectively inserted.

10. A three-dimensional hard copy apparatus according to claim 8, wherein the lock member includes a member having elasticity.

11. A three-dimensional hard copy apparatus according to claim 7, further comprising a biasing member that biases the display pins in a direction from the display position to the basic position.

12. A three-dimensional hard copy apparatus according to claim 1, wherein the drive unit includes plural cores formed of a magnetic substance, plural cylindrical slidably support sections that support the respective cores, and plural solenoids that are set so as to surround the respective support sections.

13. A three-dimensional hard copy apparatus according to claim 1, further comprising a moving unit that moves the drive unit relative to the shape forming unit.

14. A three-dimensional hard copy apparatus comprising:

a shape forming unit that is capable of forming a predetermined pattern and includes:

a display surface; and plural pins which are in contact with a sheet-like object to be molded, have contact sections provided on the display surface side at tips thereof, and are provided to be movable with respect to the display surface;

a drive unit that selectively drives the plural pins;

a holding unit that respectively holds positions of the plural pins;

a press-contact unit that moves one of the object to be molded and the shape forming unit with respect to the other in a direction in which the object to be molded and the shape forming unit approach each other and brings the object to be molded and the shape forming unit into press contact with each other; and a cooling unit that cools the object to be molded;

wherein the three-dimensional hard copy apparatus forms the predetermined pattern with the shape forming unit, holds the plural pins with the holding unit, and brings the object to be molded and the shape forming unit into press contact with each other with the press contact unit to form a pattern of a shape matching the predetermined pattern formed by the shape forming unit on the object to be molded.

15. A three-dimensional hard copy apparatus according to claim 14, wherein the cooling unit is constituted to attract the object to be molded in a direction in which the object to be molded approaches the shape forming unit to lower the atmospheric pressure and cool the object to be molded.

16. A three-dimensional hard copy apparatus according to claim 14, wherein the press contact unit also serves as the cooling unit.

* * * * *